(12) United States Patent
Tang et al.

(10) Patent No.: US 10,979,170 B2
(45) Date of Patent: Apr. 13, 2021

(54) CONFIGURATION RESOURCE INDICATION METHOD AND APPARATUS

(71) Applicant: HUAWEI TECHNOLOGIES CO., LTD., Guangdong (CN)

(72) Inventors: Xiaoyong Tang, Shenzhen (CN); Enzhi Zhou, Chengdu (CN); Huang Huang, Shenzhen (CN); Yalin Liu, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 12 days.

(21) Appl. No.: 16/523,396

(22) Filed: Jul. 26, 2019

(65) Prior Publication Data

US 2019/0349124 A1    Nov. 14, 2019

Related U.S. Application Data

(63) Continuation of application No. PCT/CN2017/107544, filed on Oct. 24, 2017.

(30) Foreign Application Priority Data

Jan. 26, 2017    (CN) .......................... 201710061663.8

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0051* (2013.01); *H04L 25/0226* (2013.01); *H04W 24/10* (2013.01); *H04W 72/046* (2013.01)

(58) Field of Classification Search
CPC . H04L 1/0026; H04L 5/0051; H04L 25/0226; H04W 24/10; H04W 72/046
See application file for complete search history.

(56) References Cited

U.S. PATENT DOCUMENTS

2013/0040684 A1    2/2013  Yu et al.
2015/0071195 A1*   3/2015  Park ...................... H04L 5/0048
(Continued)

FOREIGN PATENT DOCUMENTS

CA          2986418 A1    8/2013
CN        103873124 A     6/2014
(Continued)

OTHER PUBLICATIONS

Zte et al., "Beam related indication for DL and UL beam management," 3GPP TSG RAN WG1 NR Ad-Hoc Meeting, R1-1700123, Spokane, USA, XP051207666, Jan. 16-20, 2017, 7 pages.
(Continued)

*Primary Examiner* — Ronald B Abelson
(74) *Attorney, Agent, or Firm* — Fish & Richardson P.C.

(57) ABSTRACT

The present disclosure relate to configuration resource indication methods and apparatus. One example method includes receiving, by user equipment, configuration information from a network device, and determining, by the user equipment, a channel state information-reference signal (CSI-RS) measurement resource and a sounding reference signal (SRS) measurement resource based on the configuration information.

20 Claims, 15 Drawing Sheets

(51) Int. Cl.
*H04W 24/10* (2009.01)
*H04W 72/04* (2009.01)
*H04L 25/02* (2006.01)

(56) References Cited

U.S. PATENT DOCUMENTS

2016/0204921 A1 7/2016 Kim et al.
2017/0005711 A1 1/2017 Yu et al.

FOREIGN PATENT DOCUMENTS

| | | |
|---|---|---|
| CN | 103875190 A | 6/2014 |
| CN | 104081681 A | 10/2014 |
| CN | 104105132 A | 10/2014 |
| WO | 2015034311 A1 | 3/2015 |
| WO | 2018182241 A1 | 10/2018 |

OTHER PUBLICATIONS

Office Action issued in Chinese Application No. 201710061663.8 dated Feb. 25, 2020, 15 pages (with English translation).
PCT International Search Report and Written Opinion issued in International Application No. PCT/CN2017/107544 dated Jan. 16, 2018, 19 pages (with English translation).
Extended European Search Report issued in European Application No. 17894208.2 dated Dec. 11, 2019, 9 pages.
Office Action issued in Chinese Application No. 201710061663.8 dated Oct. 12, 2020, 6 pages (with English translation).
Vivo, "Discussion on beam management for NR MIMO," 3GPP TSG RAN WG1 AH_NR Meeting, R1-1700274, Spokane, USA, Jan. 16-20, 2017, 7 pages.

\* cited by examiner

CONFIGURATION RESOURCE INDICATION METHOD AND APPARATUS

CROSS-REFERENCE TO RELATED APPLICATIONS

This application is a continuation of International Application No. PCT/CN2017/107544, filed on Oct. 24, 2017, which claims priority to Chinese Patent Application No. 201710061663.8, filed on Jan. 26, 2017. The disclosures of the aforementioned applications are hereby incorporated by reference in their entireties.

TECHNICAL FIELD

This application relates to the field of communications technologies, and in particular, to a configuration resource indication method and an apparatus.

BACKGROUND

With rapid development of communications technologies, increasingly more frequency resources are required. Currently, to resolve a problem of a lack of frequency resources, increasingly more communications systems that use high frequency bands emerge. Because a path loss of a signal in a high frequency band is greatly increased, a beamforming technology needs to be used to improve signal received power. Beamforming is a signal preprocessing technology based on an antenna array. A weighting coefficient of each array element in the antenna array is adjusted to generate a directional beam, so that an obvious array gain can be obtained.

In a high-frequency communications system, a base station (BS) and user equipment (UE) need to simultaneously use a group of proper beamforming weighting coefficients, so that receive power is higher than a specific threshold. In this case, the base station and the UE achieve beam alignment. However, because of movement of the UE, an environment change, and the like, an optimal weighting coefficient for implementing beam alignment changes in real time. To ensure that a communication link is uninterrupted, beam alignment, namely, weighting coefficient adjustment, needs to be performed between the base station and the UE in real time.

Currently, uplink beam alignment and downlink beam alignment are implemented by using two independent beam alignment processes. An uplink beam alignment process is similar to a downlink beam alignment process. A beam alignment process is described below by using an example of downlink narrow beam alignment. As shown in FIG. 1, a specific process of downlink narrow beam alignment includes four phases. In a channel state information-reference signal (CSI-RS) configuration phase, a base station allocates, by using signaling, CSI-RS resources and beam scanning manners that are required in subsequent phases to UE, and notifies the UE of a time-frequency resource location in a reporting phase. In a scanning phase of the base station, the base station transmits a CSI-RS on a CSI-RS resource by using a plurality of narrow beams (namely, transmit beams), to scan the transmit beams. In this process, the UE receives the CSI-RS by using a wide beam, and measures signal strength of the transmit beams on the CSI-RS resource. In a reporting phase of the UE, the UE selects a transmit beam (namely, an optimal transmit beam) with maximum signal strength, and reports an index number of the beam and corresponding reference signal received power (RSRP) to the base station by using a configured time-frequency resource in the reporting phase. In a scanning phase of the UE, the base station transmits a pilot signal on the CSI-RS resource by using the optimal transmit beam. In this process, the UE receives the pilot signal by using a plurality of narrow beams, measures signal strength of each narrow beam on the CSI-RS resource, and selects an optimal receive beam based on the signal strength. In this case, the uplink beam alignment process is completed.

However, in the foregoing beam alignment process, uplink beam alignment and downlink beam alignment cannot be performed simultaneously, and corresponding time-frequency resources need to be allocated to two times of beam scanning in one beam alignment process. Therefore, during implementation of uplink beam alignment and downlink beam alignment, four times of beam scanning are required in total, and a corresponding time-frequency resource is allocated to each time of scanning. As a result, time-frequency resource overheads are relatively high.

SUMMARY

Embodiments of the present invention provide a configuration resource indication method and an apparatus, to resolve a prior-art problem that uplink beam alignment and downlink beam alignment cannot be performed simultaneously and time-frequency resource overheads are high in a beam alignment process.

To achieve the foregoing objective, the following technical solutions are used in the embodiments of the present invention.

According to a first aspect, a configuration resource indication method is provided. The method includes: generating, by a base station, configuration information, where the configuration information includes information used to indicate a relationship between a channel state information-reference signal CSI-RS measurement resource and a sounding reference signal SRS measurement resource; and sending, by the base station, the configuration information at a configuration moment. In the technical solution, the base station sends, to user equipment by using configuration information, the information used to indicate the relationship between the CSI-RS measurement resource and the SRS measurement resource, so as to associate the CSI-RS measurement resource and the SRS measurement resource that are used for beam alignment. In this way, the base station and the user equipment complete uplink beam alignment and downlink beam alignment in one beam alignment process, so as to reduce time-frequency resource overheads, thereby improving beam alignment efficiency.

In a possible implementation of the first aspect, the configuration information further includes configuration information of one or more SRS measurement resources and/or configuration information of one or more CSI-RS measurement resources. In the optional technical solution, the base station may configure one or more measurement resources for an SRS and/or a CSI-RS by using the configuration information, thereby reducing signaling overheads for configuring the SRS and/or the CSI-RS by the base station.

In a possible implementation of the first aspect, the information used to indicate the relationship between the channel state information-reference signal CSI-RS measurement resource and the sounding reference signal SRS measurement resource includes at least one type of the following information: a time offset or a time offset index of a time location of the CSI-RS measurement resource relative to the configuration moment, and a time offset or a time offset index of a time location of the SRS measurement resource relative to the configuration moment; a time offset or a time offset index of a time location of the CSI-RS measurement resource relative to the configuration moment, and a time offset or a time offset index of a time location of the SRS measurement resource relative to the CSI-RS measurement resource; or a time offset or a time offset index of a time location of the SRS measurement resource relative to the configuration moment, and a time offset or a time offset index of a time location of the CSI-RS measurement resource relative to the SRS measurement resource. In the optional technical solution, various types of possible information used to indicate the relationship between the CSI-RS measurement resource and the SRS measurement resource is provided, so that when an SRS and/or a CSI-RS are/is configured based on the information, signaling overheads for configuring the SRS and/or the CSI-RS by the base station can be reduced.

In a possible implementation of the first aspect, when a reference signal measurement resource is periodically configured or semi-statically configured, and the reference signal measurement resource is the CSI-RS measurement resource or the SRS measurement resource, there are at least two measurement resources used for an SRS, and there are at least two measurement resources used for a CSI-RS. Correspondingly, the time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource. Correspondingly, the time offset or the time offset index of a time location of the SRS measurement resource relative to the configuration moment specifically includes a time offset or a time offset index of a time location of a first SRS measurement resource relative to the configuration moment, and a resource index of at least one SRS measurement resource. In the optional technical solution, the base station may periodically or semi-statically configure a measurement resource for the SRS and/or the CSI-RS by using different time offsets or time offset indexes and resource indexes of measurement resources.

In a possible implementation of the first aspect, the configuration information further includes information used to indicate relative locations of the CSI-RS measurement resource and the SRS measurement resource. In the optional technical solution, the base station may implicitly indicate a beam scanning manner by using the relative locations of the CSI-RS measurement resource and the SRS measurement resource, thereby reducing signaling interaction between the base station and the user equipment.

In a possible implementation of the first aspect, if a first beam set is a beam set used by the base station to receive the SRS, and a second beam set is a beam set used by the base station to send the CSI-RS, the second beam set is a subset of the first beam set. In the optional technical solution, when performing beam alignment on the CSI-RS measurement resource and the SRS measurement resource, the base station and the user equipment may implement uplink beam alignment and downlink beam alignment in one beam alignment process, thereby improving beam alignment efficiency while reducing time-frequency resources.

According to a second aspect, a configuration resource indication method is provided. The method includes: receiving, by user equipment, configuration information from a network device, where the configuration information includes information used to indicate a relationship between a channel state information-reference signal CSI-RS measurement resource and a sounding reference signal SRS measurement resource; and determining the CSI-RS measurement resource and the SRS measurement resource based on the configuration information.

In a possible implementation of the second aspect, the configuration information further includes configuration information of one or more SRS measurement resources and/or configuration information of one or more CSI-RS measurement resources.

In a possible implementation of the second aspect, if the information used to indicate the relationship between the channel state information-reference signal CSI-RS measurement resource and the sounding reference signal SRS measurement resource includes a time offset or a time offset index of a time location of the CSI-RS measurement resource relative to a configuration moment, and a time offset or a time offset index of a time location of the SRS measurement resource relative to the configuration moment, the determining the CSI-RS measurement resource and the SRS measurement resource based on the configuration information includes: determining the CSI-RS measurement resource based on the time offset or the time offset index of a time location of the CSI-RS measurement resource relative to the configuration moment; and determining the SRS measurement resource based on the time offset or the time offset index of a time location of the SRS measurement resource relative to the configuration moment.

In a possible implementation of the second aspect, if the information used to indicate the relationship between the channel state information-reference signal CSI-RS measurement resource and the sounding reference signal SRS measurement resource includes a time offset or a time offset index of a time location of the CSI-RS measurement resource relative to a configuration moment, and a time offset or a time offset index of a time location of the SRS measurement resource relative to the CSI-RS measurement resource, the determining the CSI-RS measurement resource and the SRS measurement resource based on the configuration information includes: determining the CSI-RS measurement resource based on the time offset or the time offset index of a time location of the CSI-RS measurement resource relative to the configuration moment; and determining the SRS measurement resource based on the CSI-RS measurement resource and the time offset or the time offset index of a time location of the SRS measurement resource relative to the CSI-RS measurement resource.

In a possible implementation of the second aspect, if the information used to indicate the relationship between the channel state information-reference signal CSI-RS measurement resource and the sounding reference signal SRS measurement resource includes a time offset or a time offset index of a time location of the SRS measurement resource relative to a configuration moment, and a time offset or a time offset index of a time location of the CSI-RS measurement resource relative to the SRS measurement resource, the determining the CSI-RS measurement resource and the SRS measurement resource based on the configuration information includes: determining the SRS measurement resource based on the time offset or the time offset index of a time location of the SRS measurement resource relative to the configuration moment; and determining the CSI-RS measurement resource based on the SRS measurement resource and the time offset or the time offset index of a time location of the CSI-RS measurement resource relative to the SRS measurement resource.

In a possible implementation of the second aspect, when a reference signal measurement resource is periodically configured or semi-statically configured, and the reference signal measurement resource is the CSI-RS measurement resource or the SRS measurement resource, there are at least two measurement resources used for an SRS, and there are at least two measurement resources used for a CSI-RS.

If the time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource, the determining the CSI-RS measurement resource based on the time offset or the time offset index of a time location of the CSI-RS measurement resource relative to the configuration moment includes: determining the first CSI-RS measurement resource based on the time offset or the time offset index of a time location of the first CSI-RS measurement resource relative to the configuration moment; and determining the at least one CSI-RS measurement resource based on the first CSI-RS measurement resource and the resource index of the at least one CSI-RS measurement resource.

Alternatively, if the time offset or the time offset index of a time location of the SRS measurement resource relative to the configuration moment specifically includes a time offset or a time offset index of a time location of a first SRS measurement resource relative to the configuration moment, and a resource index of at least one SRS measurement resource, the determining the SRS measurement resource based on the time offset or the time offset index of a time location of the SRS measurement resource relative to the configuration moment includes: determining the first SRS measurement resource based on the time offset or the time offset index of a time location of the first SRS measurement resource relative to the configuration moment; and determining the at least one SRS measurement resource based on the first SRS measurement resource and the resource index of the at least one SRS measurement resource.

In a possible implementation of the second aspect, after the determining the CSI-RS measurement resource and the SRS measurement resource based on the configuration information, the method further includes: determining a beam scanning manner of the user equipment based on relative locations of the CSI-RS measurement resource and the SRS measurement resource; or if the configuration information further includes information used to indicate relative locations of the CSI-RS measurement resource and the SRS measurement resource, the method further includes: determining a beam scanning manner of the user equipment based on the configuration information.

In a possible implementation of the second aspect, if a third beam set is a beam set used by the user equipment to receive the CSI-RS, and a fourth beam set is a beam set used by the user equipment to send the SRS, the fourth beam set is a subset of the third beam set.

According to a third aspect, a base station is provided. The base station includes: a generation unit, configured to generate configuration information, where the configuration information includes information used to indicate a relationship between a channel state information-reference signal CSI-RS measurement resource and a sounding reference signal SRS measurement resource; and a sending unit, configured to send the configuration information at a configuration moment.

In a possible implementation of the third aspect, the configuration information further includes configuration information of one or more SRS measurement resources and/or configuration information of one or more CSI-RS measurement resources.

In a possible implementation of the third aspect, the information used to indicate the relationship between the channel state information-reference signal CSI-RS measurement resource and the sounding reference signal SRS measurement resource includes at least one type of the following information: a time offset or a time offset index of a time location of the CSI-RS measurement resource relative to a configuration moment, and a time offset or a time offset index of a time location of the SRS measurement resource relative to the configuration moment; a time offset or a time offset index of a time location of the CSI-RS measurement resource relative to a configuration moment, and a time offset or a time offset index of a time location of the SRS measurement resource relative to the CSI-RS measurement resource; or a time offset or a time offset index of a time location of the SRS measurement resource relative to a configuration moment, and a time offset or a time offset index of a time location of the CSI-RS measurement resource relative to the SRS measurement resource.

In a possible implementation of the third aspect, when a reference signal measurement resource is periodically configured or semi-statically configured, and the reference signal measurement resource is the CSI-RS measurement resource or the SRS measurement resource, there are at least two measurement resources used for an SRS, and there are at least two measurement resources used for a CSI-RS. The time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource. The time offset or the time offset index of a time location of the SRS measurement resource relative to the configuration moment specifically includes a time offset or a time offset index of a time location of a first SRS measurement resource relative to the configuration moment, and a resource index of at least one SRS measurement resource.

In a possible implementation of the third aspect, the configuration information further includes information used to indicate relative locations of the CSI-RS measurement resource and the SRS measurement resource.

In a possible implementation of the third aspect, if a first beam set is a beam set used by the base station to receive the SRS, and a second beam set is a beam set used by the base station to send the CSI-RS, the second beam set is a subset of the first beam set.

According to a fourth aspect, user equipment is provided. The user equipment includes: a receiving unit, configured to receive configuration information from a network device, where the configuration information includes information used to indicate a relationship between a channel state information-reference signal CSI-RS measurement resource and a sounding reference signal SRS measurement resource; and a determining unit, configured to determine the CSI-RS measurement resource and the SRS measurement resource based on the configuration information.

In a possible implementation of the fourth aspect, the configuration information further includes configuration information of one or more SRS measurement resources and/or configuration information of one or more CSI-RS measurement resources.

In a possible implementation of the fourth aspect, if the information used to indicate the relationship between the channel state information-reference signal CSI-RS measurement resource and the sounding reference signal SRS measurement resource includes a time offset or a time offset index of a time location of the CSI-RS measurement resource relative to a configuration moment, and a time offset or a time offset index of a time location of the SRS measurement resource relative to the configuration moment, the determining unit is specifically configured to: determine the CSI-RS measurement resource based on the time offset or the time offset index of a time location of the CSI-RS measurement resource relative to the configuration moment; and determine the SRS measurement resource based on the time offset or the time offset index of a time location of the SRS measurement resource relative to the configuration moment.

In a possible implementation of the fourth aspect, if the information used to indicate the relationship between the channel state information-reference signal CSI-RS measurement resource and the sounding reference signal SRS measurement resource includes a time offset or a time offset index of a time location of the CSI-RS measurement resource relative to a configuration moment, and a time offset or a time offset index of a time location of the SRS measurement resource relative to the CSI-RS measurement resource, the determining unit is specifically configured to: determine the CSI-RS measurement resource based on the time offset or the time offset index of a time location of the CSI-RS measurement resource relative to the configuration moment; and determine the SRS measurement resource based on the CSI-RS measurement resource and the time offset or the time offset index of a time location of the SRS measurement resource relative to the CSI-RS measurement resource.

In a possible implementation of the fourth aspect, if the information used to indicate the relationship between the channel state information-reference signal CSI-RS measurement resource and the sounding reference signal SRS measurement resource includes a time offset T2 or a time offset index of a time location of the SRS measurement resource relative to a configuration moment, and a time offset T3 or a time offset index of a time location of the CSI-RS measurement resource relative to the SRS measurement resource, the determining unit is specifically configured to: determine the SRS measurement resource based on the time offset or the time offset index of a time location of the SRS measurement resource relative to the configuration moment; and determine the CSI-RS measurement resource based on the SRS measurement resource and the time offset or the time offset index of a time location of the CSI-RS measurement resource relative to the SRS measurement resource.

In a possible implementation of the fourth aspect, when a reference signal measurement resource is periodically configured or semi-statically configured, and the reference signal measurement resource is the CSI-RS measurement resource or the SRS measurement resource, there are at least two measurement resources used for an SRS, and there are at least two measurement resources used for a CSI-RS.

If the time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource, the determining unit is further specifically configured to: determine the first CSI-RS measurement resource based on the time offset or the time offset index of a time location of the first CSI-RS measurement resource relative to the configuration moment; and determine the at least one CSI-RS measurement resource based on the first CSI-RS measurement resource and the resource index of the at least one CSI-RS measurement resource.

Alternatively, if the time offset or the time offset index of a time location of the SRS measurement resource relative to the configuration moment specifically includes a time offset or a time offset index of a time location of a first SRS measurement resource relative to the configuration moment, and a resource index of at least one SRS measurement resource, the determining unit is further specifically configured to: determine the first SRS measurement resource based on the time offset or the time offset index of a time location of the first SRS measurement resource relative to the configuration moment; and determine the at least one SRS measurement resource based on the first SRS measurement resource and the resource index of the at least one SRS measurement resource.

In a possible implementation of the fourth aspect, the determining unit is further configured to determine a beam scanning manner of the user equipment based on relative locations of the CSI-RS measurement resource and the SRS measurement resource; or if the configuration information further includes information used to indicate relative locations of the CSI-RS measurement resource and the SRS measurement resource, the determining unit is further configured to determine a beam scanning manner of the user equipment based on the configuration information.

In a possible implementation of the fourth aspect, if a third beam set is a beam set used by the user equipment to receive the CSI-RS, and a fourth beam set is a beam set used by the user equipment to send the SRS, the fourth beam set is a subset of the third beam set.

According to a fifth aspect, a base station is provided, including a memory, a processor, a system bus, and a communications interface. The memory stores code and data. The processor is connected to the memory by using the system bus. The processor runs the code in the memory, so that the base station performs the configuration resource indication method provided in any one of the first aspect or the possible implementations of the first aspect.

According to a sixth aspect, user equipment is provided, including a memory, a processor, a system bus, and a communications interface. The memory stores code and data. The processor is connected to the memory by using the system bus. The processor runs the code in the memory, so that the user equipment performs the configuration resource indication method provided in any one of the second aspect or the possible implementations of the second aspect.

According to a seventh aspect, a communications system is provided. The communications system includes a base station and user equipment. The base station is the base station provided in the third aspect or the fifth aspect, and/or the user equipment is the user equipment provided in the fourth aspect or the sixth aspect.

Another aspect of this application provides a computer readable storage medium. The computer readable storage medium stores an instruction, and when the instruction runs on a computer, the computer performs the methods in the foregoing aspects.

Another aspect of this application provides a computer program product that includes an instruction. When the computer program product runs on a computer, the computer performs the methods in the foregoing aspects.

It may be understood that any apparatus, any computer storage medium, or any computer program product used for the configuration resource indication method provided above is configured to perform a corresponding method provided above. Therefore, for advantageous effects that can be achieved by any apparatus, any computer storage medium, or any computer program product, refer to advantageous effects in the corresponding method provided above. Details are not described herein again.

DESCRIPTION OF EMBODIMENTS

Figure 1:
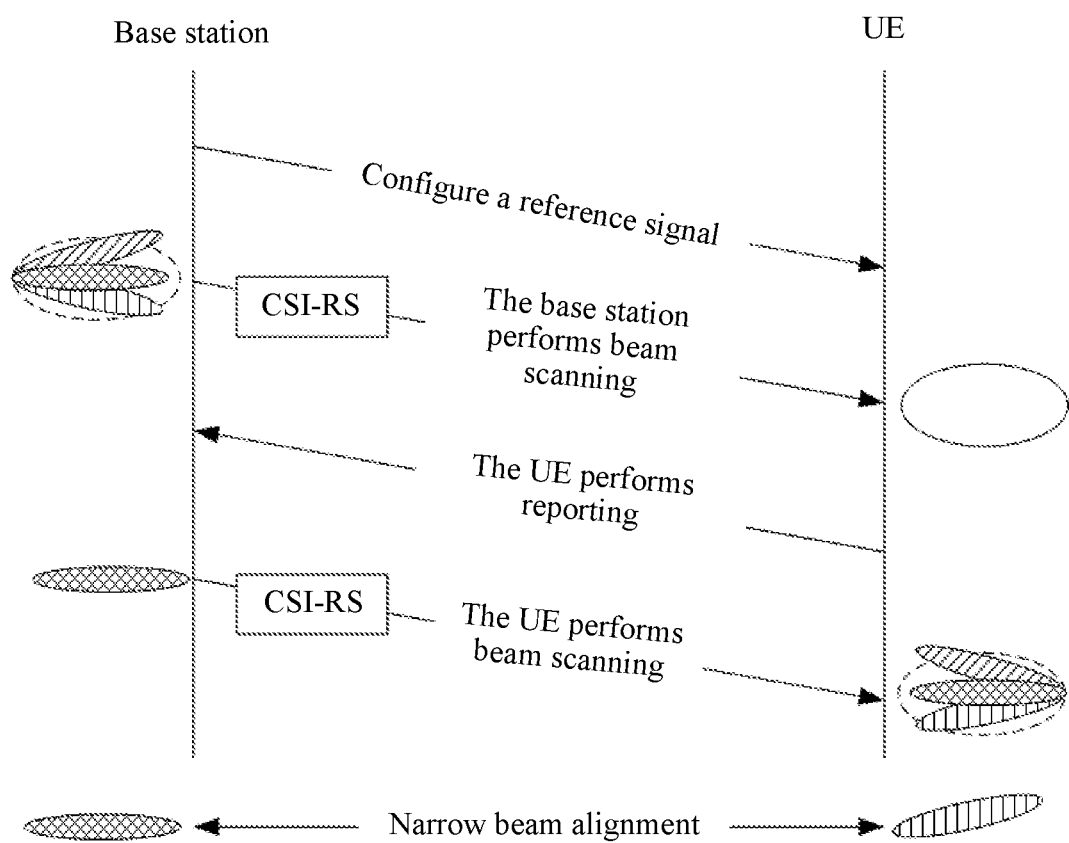
FIG. 1 is a schematic diagram of a beam alignment procedure.
Figure 2:
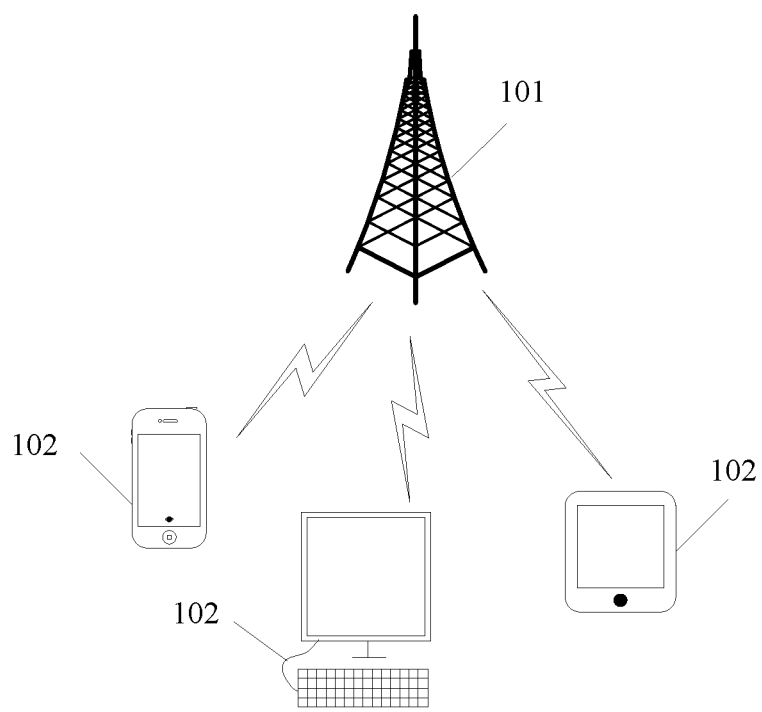
FIG. 2 is a schematic structural diagram of a communications system according to an embodiment of the present invention.

FIG. 2 is a schematic structural diagram of a communications system to which an embodiment of the present invention is applied. Referring to FIG. 2, the communications system includes a base station 101 and user equipment 102.

The base station 101 has a function of scheduling a shared channel, and has a function of establishing scheduling based on a history of packet data sent to the user equipment 102. Scheduling means that when a plurality of user equipments 102 share a transmission resource, a mechanism is required to effectively allocate a physical layer resource, so as to obtain a statistical multiplexing gain. The user equipment 102 has a function of sending and receiving data through a communication channel established between the user equipment 102 and the base station 101. The user equipment 102 sends or receives a shared channel based on information sent through a scheduling control channel. In addition, the user equipment 102 may be a mobile station, a mobile phone, a computer, a portable terminal, or the like.

Data is received and sent between the base station 101 and the user equipment 102 through a communication channel. The communication channel may be a wireless communication channel. There is at least a shared channel and a scheduling control channel in the wireless communication channel. The shared channel is shared between the plurality of user equipments 102 to send and receive a packet. The scheduling control channel is used to send allocation, a corresponding scheduling result, and the like of the shared channel.

Figure 3:
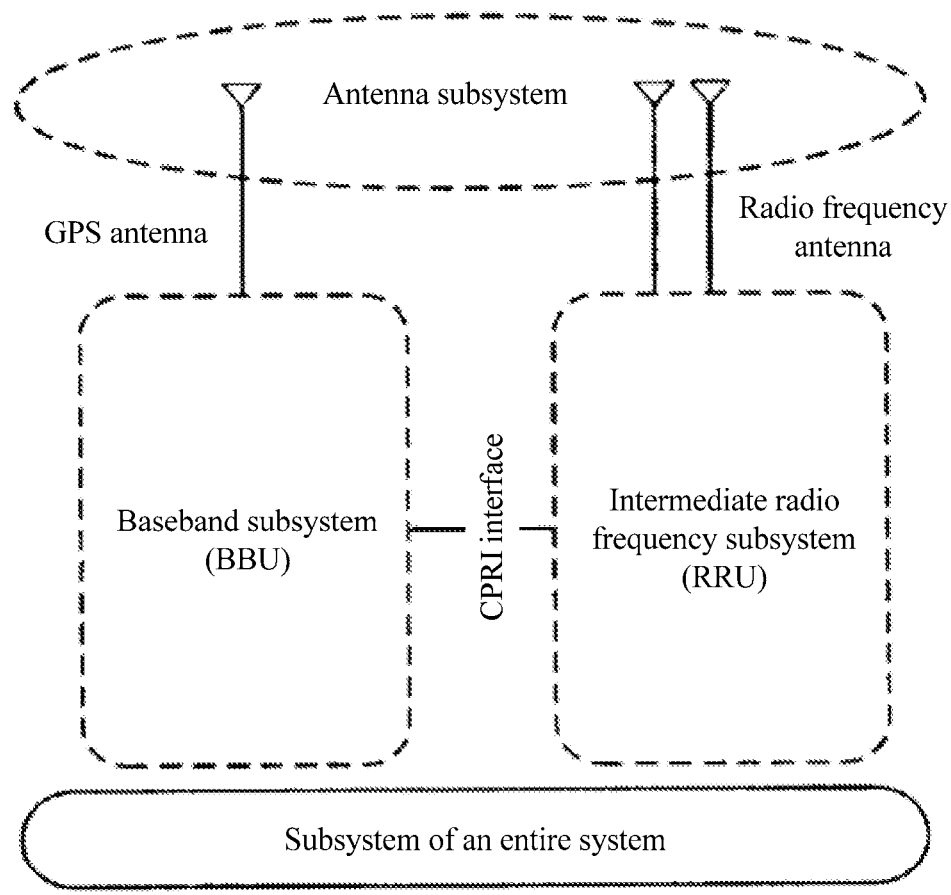
FIG. 3 is a schematic structural diagram of a base station according to an embodiment of the present invention.

FIG. 3 is a structural diagram of hardware of a base station according to an embodiment of the present invention. As shown in FIG. 3, the base station includes a baseband subsystem, an intermediate radio frequency subsystem, an antenna subsystem, and some support structures (for example, a subsystem of an entire system). The baseband subsystem is configured to implement operation and maintenance of an entire base station, implement signaling processing, a radio resource principle, and a transmission interface to a packet core network, and implement physical layer signaling processing, media access control layer resource allocation, L3 signaling configuration, and a main control function of operation and maintenance. The intermediate radio frequency subsystem implements conversion between a baseband signal, an intermediate frequency signal, and a radio frequency signal, and implements demodulation of a received radio signal, and modulation and power amplification of a sent signal. The antenna subsystem includes an antenna and a feeder that are connected to a radio frequency module of the base station, and an antenna and a feeder that are of a GRS receiving card, and is configured to receive and send a wireless air interface signal. The subsystem of the entire system is a support part of the baseband subsystem and the intermediate radio frequency subsystem, and provides a structure and functions of power supply and environment monitoring.

Figure 4:
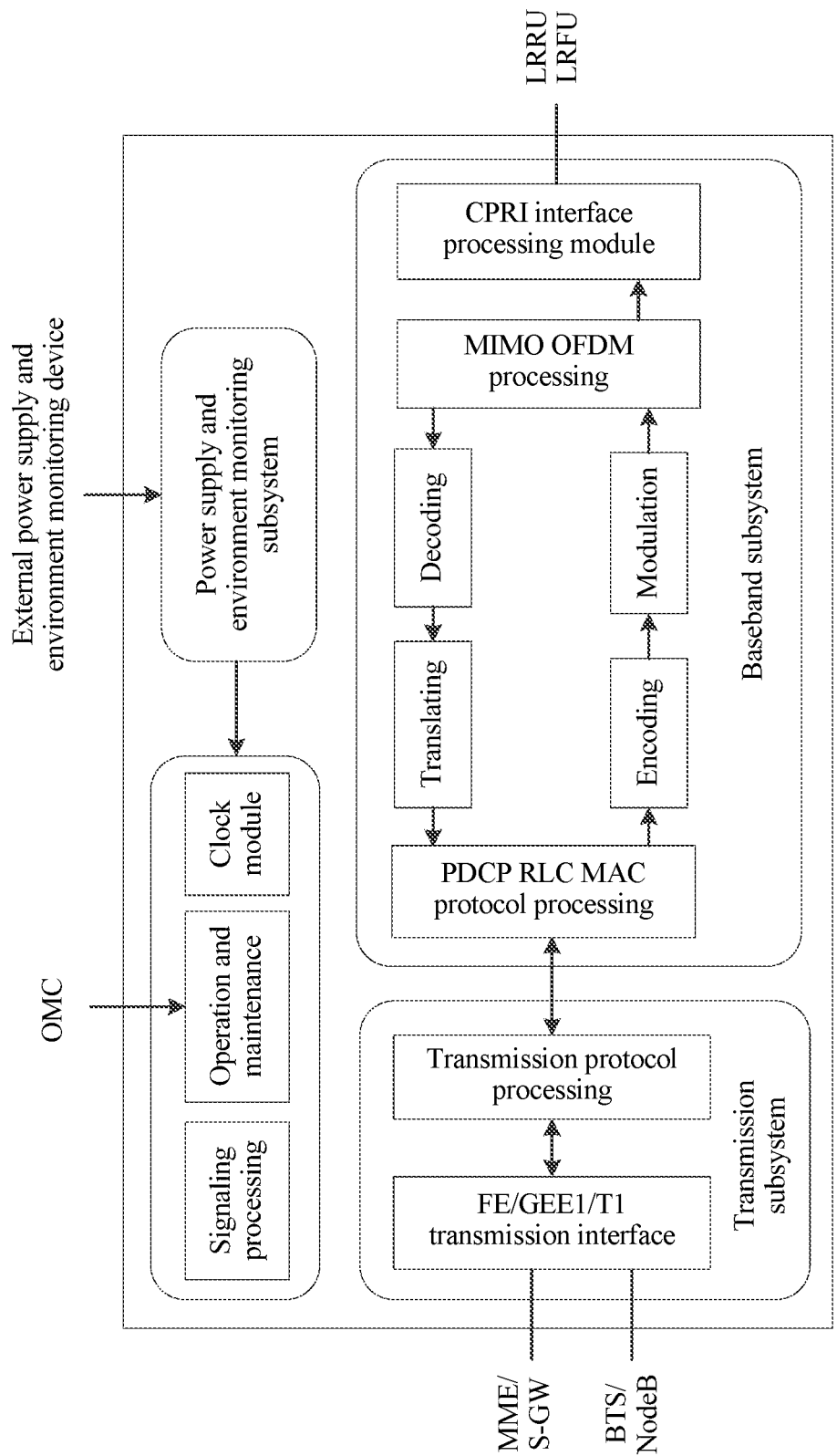
FIG. 4 is a schematic structural diagram of a baseband subsystem according to an embodiment of the present invention.

The baseband subsystem may be shown in FIG. 4. For example, a mobile phone needs to perform the following to access the internet: The mobile phone accesses a core network by using the base station, and then accesses the internet by using the core network. Data of the internet is transmitted to a baseband part by using an interface between the core network and the base station. The baseband part performs processing such as processing at a PDCP layer, an RLC layer, and a MAC layer, and encoding and modulation at a PHY layer, and sends processed data to a radio frequency part. The radio frequency part transmits the processed data to user equipment. The baseband part and the radio frequency part may be connected to each other by using a CPRI interface. In addition, an optical fiber is currently used to extend the radio frequency part, for example, an remote RRU. Each step of a configuration resource indication method in the embodiments of the present invention is implemented by a baseband by using a radio frequency. In addition, a receiving step and a sending step are implemented by using an antenna (for example, an air interface).

An interface between user equipment and a base station in the embodiments of the present invention may be understood as an air interface for communication between the user equipment and the base station, or the interface may be referred to as a Uu interface.

Figure 5:
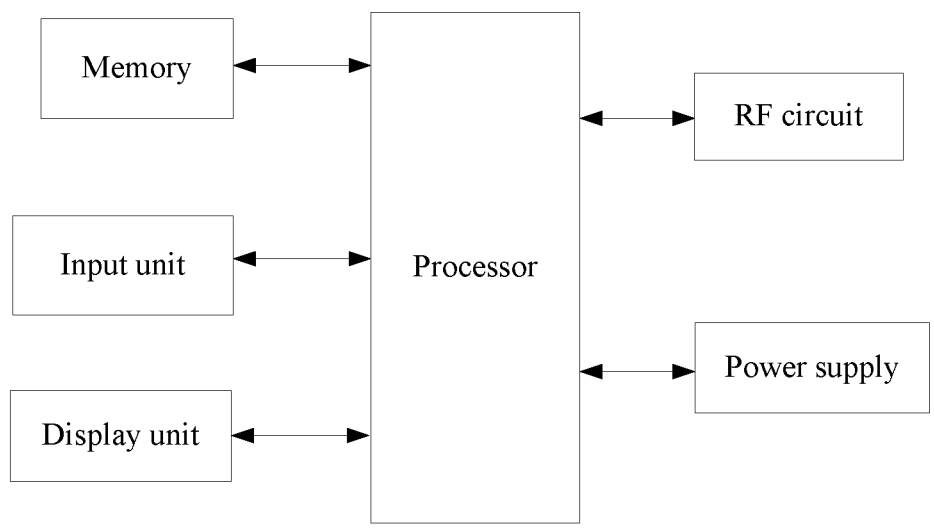
FIG. 5 is a schematic structural diagram of user equipment according to an embodiment of the present invention.

FIG. 5 is a schematic structural diagram of user equipment to which an embodiment of the present invention. The user equipment may be a mobile phone, a tablet computer, a notebook computer, an ultra-mobile personal computer, a netbook, a personal digital assistant, or the like. This embodiment of the present invention is described by using an example in which the user equipment is a mobile phone.

As shown in FIG. 5, the mobile phone may include components such as a memory, a processor, a radio frequency (RF) circuit, and a power supply. A person skilled in the art may understand that the structure of the mobile phone shown in FIG. 5 constitutes no limitation to the mobile phone. Components more or fewer than those shown in the figure may be included, or some components are combined, or component arrangements are different.

Each component of the mobile phone is specifically described below with reference to FIG. 5.

The memory may be configured to store a software program and a module. The processor performs various function applications and data processing of the mobile phone by running the software program and the module stored in the memory. The memory may mainly include a program storage area and a data storage area. The program storage area may store an operating system, an application program required by at least one function, and the like. The data storage area may store data created based on use of the mobile phone, and the like. In addition, the memory may include a high-speed random access memory, and may further include a nonvolatile memory and the like.

The processor is a control center of the mobile phone and is connected to all parts of the entire mobile phone through various interfaces and lines, and performs various functions and data processing of the mobile phone by running or executing the software program and/or module stored in the memory and invoking data stored in the memory, to perform overall monitoring on the mobile phone. Optionally, the processor may include one or more processing units. Preferably, an application processor and a modem processor may be integrated into the processor. The application processor mainly processes an operating system, a user interface, an application program, and the like, and the modem processor mainly processes wireless communication.

The RF circuit may be configured to receive and send information, or receive and send a signal during a call. The RF circuit usually includes but is not limited to an antenna, at least one amplifier, a transceiver, a coupler, a low noise amplifier, a duplexer, and the like. In addition, the RF circuit may further communicate with a network and another device through wireless communication. Any communications standard or protocol may be used for the wireless communication, and includes but is not limited to a global system for mobile communications, a general packet radio service, code division multiple access, wideband code division multiple access, long term evolution, an email, a short message service, and the like.

The mobile phone further includes the power supply that supplies power to each component. The power supply may be logically connected to the processor by using a power management system, so as to implement functions such as charging management, discharging management, and power consumption management by using the power management system.

Although not shown, the mobile phone may further include an input unit, a display unit, a sensor module, an audio module, a WiFi module, a Bluetooth module, and the like. Details are not described herein.

A basic principle of the present invention lies in that a base station sends configuration information to user equipment, so as to associate a channel state information-reference signal CSI-RS measurement resource and a sounding reference signal (SRS) measurement resource that are used for beam alignment. In this way, the base station and the user equipment determine the CSI-RS measurement resource and the SRS measurement resource based on the configuration information. Therefore, in a beam alignment process, the base station and the user equipment complete uplink beam alignment and downlink beam alignment in one beam alignment process based on a fact that an uplink beam and a downlink beam have a correspondence (correspondence) and based on the associated CSI-RS measurement resource and SRS measurement resource, thereby reducing time-frequency resource overheads and improving efficiency of uplink beam alignment and downlink beam alignment.

Figure 6:
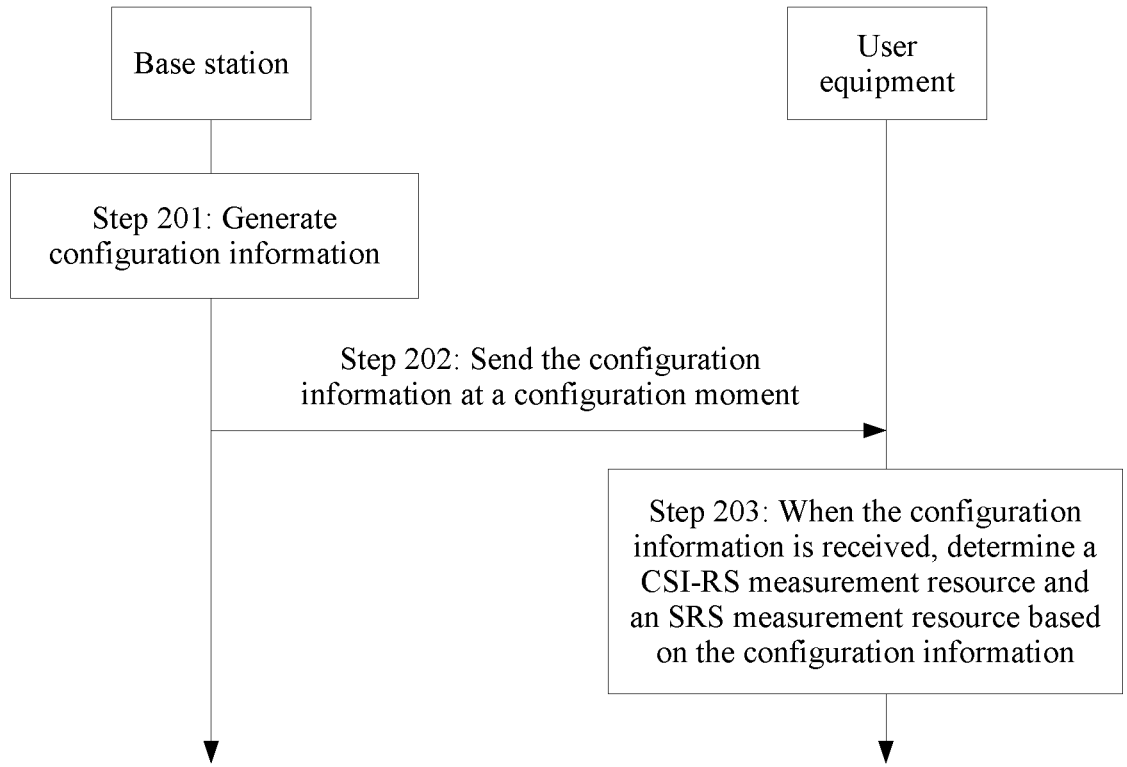
FIG. 6 is a flowchart of a configuration resource indication method according to an embodiment of the present invention.

FIG. 6 is a flowchart of a configuration resource indication method according to an embodiment of the present invention. Referring to FIG. 6, the method includes the following several steps.

Step 201: A base station generates configuration information, where the configuration information includes information used to indicate a relationship between a channel state information-reference signal CSI-RS measurement resource and a sounding reference signal SRS measurement resource.

A CSI-RS is a downlink reference signal used when channel status (for example, channel quality information (CQI)/a precoding matrix indicator (PMI)/a rank indicator (RI) measurement, or beam management is performed. The CSI-RS measurement resource is a time-frequency resource configured by the base station for the CSI-RS, and is used by the base station and user equipment to perform beam alignment. In a beam alignment process, the base station may send the CSI-RS on the CSI-RS measurement resource, and the user equipment may receive and measure, on the CSI-RS measurement resource, the CSI-RS sent by the base station.

An SRS is an uplink reference signal used when channel estimation or beam management is performed. The SRS measurement resource is a time-frequency resource configured by the base station for the SRS, and is used by the base station and the user equipment to perform beam alignment. In a beam alignment process, the user equipment may send the SRS on the SRS measurement resource, and the base station may receive and measure, on the SRS measurement resource, the SRS sent by the user equipment.

In addition, the relationship between the CSI-RS measurement resource and the SRS measurement resource is a relationship between a time-frequency resource used by the base station to send the CSI-RS measurement resource and a time-frequency resource used by the user equipment to send the SRS in a beam alignment process.

In an example embodiment of the present invention, the information used to indicate the relationship between the CSI-RS measurement resource and the SRS measurement resource may include one type of the following information: a time offset or a time offset index of a time location of the CSI-RS measurement resource relative to a configuration moment, and a time offset or a time offset index of a time location of the SRS measurement resource relative to the configuration moment; a time offset or a time offset index of a time location of the CSI-RS measurement resource relative to a configuration moment, and a time offset or a time offset index of the SRS measurement resource relative to the CSI-RS measurement resource; or a time offset or a time offset index of a time location of the SRS measurement resource relative to a configuration moment, and a time offset or a time offset index of a time location of the CSI-RS measurement resource relative to the SRS measurement resource.

The time offset index is used to identify the time offset. Different time offset indexes may correspond to different time offsets, and a correspondence between a time offset index and a time offset may be preset. For example, in a correspondence shown in Table 1 below, the time offset index may be an index number corresponding to the time offset. A time unit corresponding to the time offset may be a slot, an OFDM symbol, or an absolute time. The absolute time may be a microsecond (µs), a millisecond (ms), a second (s), or the like. For example, T1 may be 2 ms, T2 may be 4 ms, and different time offsets may correspond to different time lengths.

TABLE 1

| Time offset index | Time offset |
|---|---|
| 1 | T1 |
| 2 | T2 |
| 3 | T3 |
| ... | ... |
| N | $T_N$ |

It should be noted that the correspondence between the time offset index and the time offset shown in Table 1 is only an example, and Table 1 constitutes no limitation to this embodiment of the present invention.

In addition, the information used to indicate the relationship between the CSI-RS measurement resource and the SRS measurement resource may include only information about a time offset, may include only information about a time offset index, or may include both information about a time offset and information about a time offset index. When the information used to indicate the relationship between the CSI-RS measurement resource and the SRS measurement resource includes the information about the time offset index, a corresponding time offset may be determined based on a preset correspondence between a time offset index and a time offset. The relationship that is between the CSI-RS measurement resource and the SRS measurement resource and that is indicated by the configuration information is described in detail below by using the time offset as an example.

Figure 7:
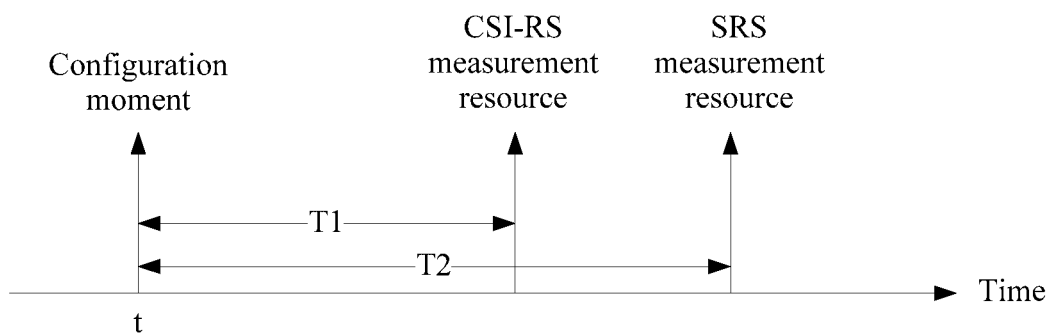
FIG. 7 is a schematic diagram of a first relationship between a CSI-RS measurement resource and an SRS measurement resource according to an embodiment of the present invention.
Figure 8:
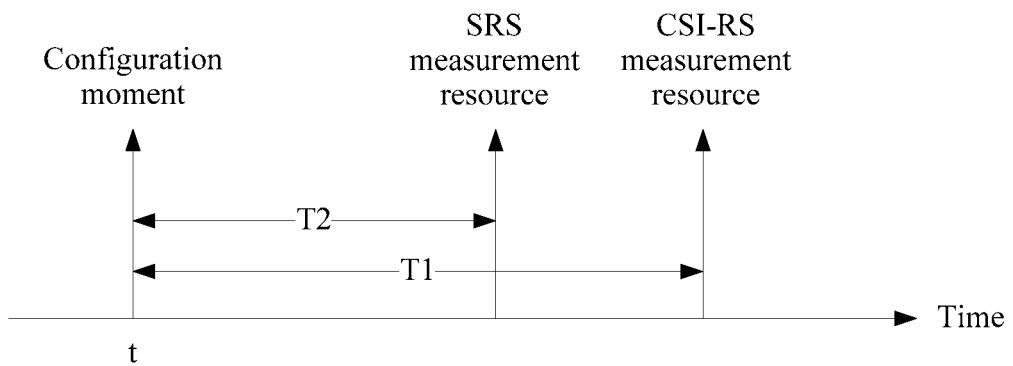
FIG. 8 is a schematic diagram of a second relationship between a CSI-RS measurement resource and an SRS measurement resource according to an embodiment of the present invention.

Specifically, when the information used to indicate the relationship between the CSI-RS measurement resource and the SRS measurement resource includes a time offset T1 of the CSI-RS measurement resource relative to the configuration moment, and a time offset T2 of the SRS measurement resource relative to the configuration moment, if T1 is less than T2, the relationship between the CSI-RS measurement resource and the SRS measurement resource may be shown in FIG. 7; or if T1 is greater than T2, the relationship between the CSI-RS measurement resource and the SRS measurement resource may be shown in FIG. 8.

Figure 9:
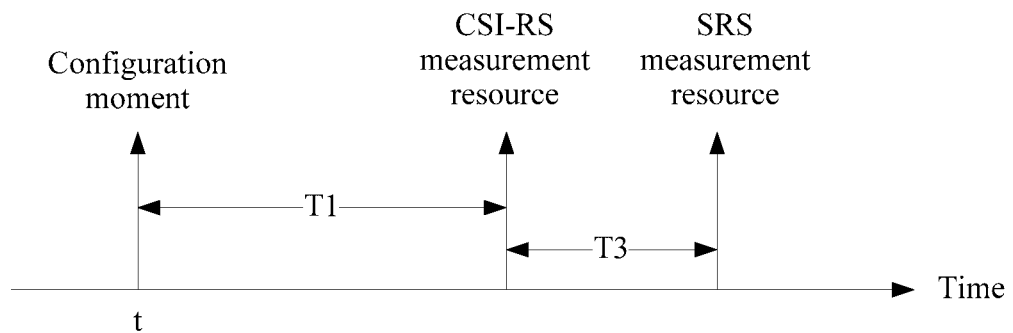
FIG. 9 is a schematic diagram of a third relationship between a CSI-RS measurement resource and an SRS measurement resource according to an embodiment of the present invention.

When the information used to indicate the relationship between the CSI-RS measurement resource and the SRS measurement resource includes a time offset T1 of the CSI-RS measurement resource relative to the configuration moment, and a time offset T3 of the SRS measurement resource relative to the CSI-RS measurement resource, the relationship between the CSI-RS measurement resource and the SRS measurement resource may be shown in FIG. 9.

Figure 10:
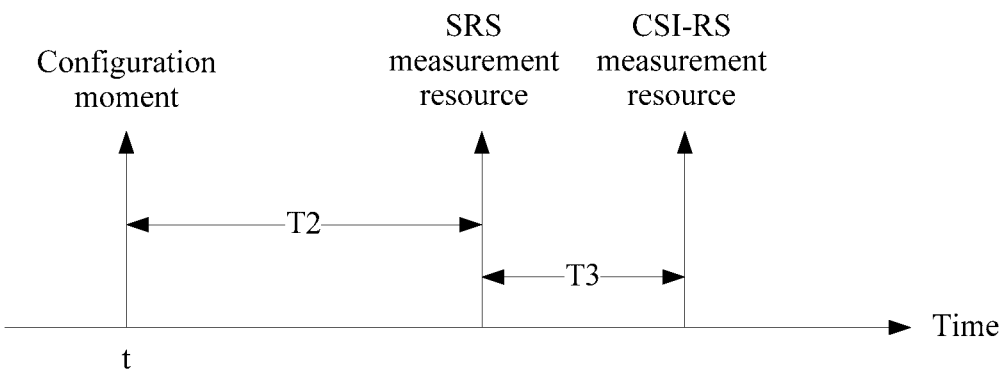
FIG. 10 is a schematic diagram of a fourth relationship between a CSI-RS measurement resource and an SRS measurement resource according to an embodiment of the present invention.

When the information used to indicate the relationship between the CSI-RS measurement resource and the SRS measurement resource includes a time offset T2 of the SRS measurement resource relative to the configuration moment, and a time offset T3 of the CSI-RS measurement resource relative to the SRS measurement resource, the relationship between the CSI-RS measurement resource and the SRS measurement resource may be shown in FIG. 10.

Further, a configuration manner of a reference signal measurement resource may include aperiodic configuration, periodic configuration, and semi-static configuration. Periodic configuration means that a reference signal measurement resource configured by the base station periodically appears in time. Semi-static configuration means that a reference signal measurement resource configured by the base station periodically appears within a specified time length, and may not be limited beyond the specified time length. Aperiodic configuration means that the base station configures a temporary reference signal measurement resource for the user equipment.

When a reference signal measurement resource is periodically configured or semi-statically configured, and the reference signal measurement resource is the CSI-RS measurement resource or the SRS measurement resource, there are at least two measurement resources used for an SRS, and there are at least two measurement resources used for a CSI-RS.

When a configuration manner of a reference signal measurement resource is aperiodic configuration, the relationship that is between the CSI-RS measurement resource and the SRS measurement resource and that is indicated by the configuration information is shown in FIG. 7 to FIG. 10. For specific information used to indicate the relationship between the CSI-RS measurement resource and the SRS measurement resource, refer to the foregoing description.

When a reference signal measurement resource is periodically configured or semi-statically configured, because there are at least two reference signal measurement resources, a location of each measurement resource needs to be indicated. In addition, when the location of each measurement resource is indicated, a time offset or a time offset index of a time location of a first measurement resource relative to the configuration moment, and a resource index of at least one measurement resource may be indicated. The at least one measurement resource is a measurement resource other than the first measurement resource in the at least two measurement resources. Each measurement resource may be identified by using a resource index, and a corresponding measurement resource may be determined based on the resource index.

Specifically, when there are at least two CSI-RS measurement resources, the time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource. When there are at least two SRS measurement resources, the time offset or the time offset index of a time location of the SRS measurement resource relative to the configuration moment specifically includes a time offset or a time offset index of a time location of a first SRS measurement resource relative to the configuration moment, and a resource index of at least one SRS measurement resource.

Figure 11:
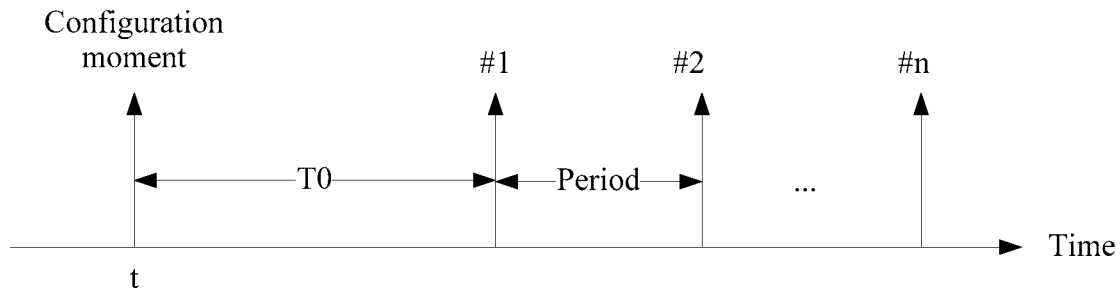
FIG. 11 is a schematic diagram of a reference signal measurement resource according to an embodiment of the present invention.

For example, a reference signal is used as an example, and a reference signal measurement resource that is periodically or semi-statically configured may be shown in FIG. 11. In FIG. 11, a time offset of a first measurement resource relative to the configuration moment is T0, and resource indexes are represented as #1, #2, . . . , and #n, so that resource indexes of at least one measurement resource are #2, . . . , and #n, and certainly, may also include #1. The resource index may alternatively be represented in another form, for example, i*period, where i may be an $i^{th}$ measurement resource, and the period is a time length in which a measurement resource periodically appears. This is not limited in this embodiment of the present invention.

A configuration manner of a reference signal measurement resource may include aperiodic configuration, periodic configuration, and semi-static configuration, and the reference signal measurement resource may include the CSI-RS measurement resource and the SRS measurement resource. Therefore, configuration of the CSI-RS measurement resource and the SRS measurement resource may include nine configuration combinations, which are specifically shown in Table 2 below.

TABLE 2

| Sequence number of combination | SRS measurement resource | CSI-RS measurement resource |
|---|---|---|
| 1 | Periodic configuration | Periodic configuration |
| 2 | Periodic configuration | Semi-static configuration |
| 3 | Periodic configuration | Aperiodic configuration |
| 4 | Semi-static configuration | Periodic configuration |
| 5 | Semi-static configuration | Semi-static configuration |
| 6 | Semi-static configuration | Aperiodic configuration |
| 7 | Aperiodic configuration | Periodic configuration |
| 8 | Aperiodic configuration | Semi-static configuration |
| 9 | Aperiodic configuration | Aperiodic configuration |

Further, the configuration information may further include configuration information of one or more SRS measurement resources and/or configuration information of one or more CSI-RS measurement resources. Specifically, if one or more CSI-RS measurement resources are preconfigured, the configuration information may further include configuration information of one or more SRS measurement resources; if one or more SRS measurement resources are preconfigured, the configuration information may further include configuration information of one or more CSI-RS measurement resources; or if neither the CSI-RS measurement resource nor the SRS measurement resource is preconfigured, the configuration information may further include configuration information of one or more SRS measurement resources and configuration information of one or more CSI-RS measurement resources.

In actual application, the base station may configure, for the user equipment, configuration information of one or more SRS measurement resources and/or configuration information of one or more CSI-RS measurement resources by using one type of configuration information, or may separately configure, for the user equipment, configuration information of one or more SRS measurement resources and configuration information of one or more CSI-RS measurement resources by using a plurality of pieces of different configuration information. For example, the base station configures, for the user equipment, the configuration information of the one or more SRS measurement resources by using first configuration information, and the base station configures, for the user equipment, the configuration information of the one or more CSI-RS measurement resources by using second configuration information.

The configuration information of the one or more SRS measurement resources may specifically include at least one type of the following information: an SRS measurement port number, time-frequency information, and an index used to identify the time-frequency information. The configuration information of the one or more CSI-RS measurement resources may also specifically include at least one type of the following information: a CSI-RS measurement port number, time-frequency information, and an index used to identify the time-frequency information.

The time-frequency information may include time domain information and frequency domain information. The time domain information is information about an OFDM symbol corresponding to the one or more SRS measurement resources in time domain. For example, the time domain information may be a symbol sequence number of an OFDM symbol in a transmission time interval (TTI). The frequency domain information is information about a subcarrier corresponding to the one or more SRS measurement resources in frequency domain. For example, the frequency domain information may be information such as a subcarrier sequence number, a subcarrier width, or a subcarrier spacing corresponding to a subcarrier in one or more resource blocks (RB).

Further, the configuration information may include information used to indicate relative locations of the CSI-RS measurement resource and the SRS measurement resource. To be specific, the base station implicitly indicates, based on the relative locations of the CSI-RS measurement resource and the SRS measurement resource, a sequence in which the base station and the user equipment perform beam scanning in a beam alignment process, and this may also be referred to as determining a beam scanning manner in the beam alignment process. Alternatively, the configuration information may further include information used to indicate a beam scanning manner. To be specific, the base station may explicitly indicate the beam scanning manner in a beam alignment process by using the configuration information, and directly determines the beam scanning manner in the beam alignment process based on the information used to indicate the beam scanning manner.

When the base station implicitly indicates the beam scanning manner in the beam alignment process, the configuration information may not include the information used to indicate the relative locations of the CSI-RS measurement resource and the SRS measurement resource. After determining locations of the CSI-RS measurement resource and the SRS measurement resource, the user equipment may directly determine the beam scanning manner in the beam alignment process based on a sequential relationship between the CSI-RS measurement resource and the SRS measurement resource.

Alternatively, the base station may implicitly indicate the beam scanning manner in the beam alignment process by using the configuration information, that is, the configuration information further includes the information used to indicate the relative locations of the CSI-RS measurement resource and the SRS measurement resource. The user equipment may directly determine the relative locations of the CSI-RS measurement resource and the SRS measurement resource based on the configuration information, so as to determine the beam scanning manner in the beam alignment process based on the relative locations.

When the user equipment determines beam scanning manners of the CSI-RS measurement resource and the SRS based on the relative locations of the SRS measurement resource and the CSI-RS measurement resource, if the SRS measurement resource is before the CSI-RS measurement resource, the user equipment may determine that the beam scanning manner in the beam alignment process is a first scanning manner; or if the CSI-RS measurement resource is before the SRS measurement resource, the user equipment may determine that the beam scanning manner in the beam alignment process is a second scanning manner. The first scanning manner and the second scanning manner may be shown in Table 3 below.

TABLE 3

| Index | Reference signal | Beam scanning manner of the base station | Beam scanning manner of the user equipment |
|---|---|---|---|
| First scanning manner | CSI-RS | The CSI-RS is sent by using a narrow beam | The CSI-RS is scanned and received by using different narrow beams |
| | SRS | The SRS is scanned and received by using different narrow beams | The SRS is sent by using a wide beam |
| Second scanning manner | CSI-RS | The CSI-RS is sent by using a wide beam | The CSI-RS is scanned and received by using different narrow beams |
| | SRS | The SRS is scanned and received by using different narrow beams | The SRS is sent by using a narrow beam |

In actual application, the base station may configure, for the user equipment, the beam scanning manner in the beam alignment process by using the configuration information in step 201, or may configure the beam scanning manner by using other configuration information, higher layer signaling, or the like. This is not limited in this embodiment of the present invention.

Step 202: The base station sends the configuration information to user equipment at a configuration moment.

After the base station generates the configuration information, the base station may send the configuration information to the user equipment at the configuration moment, so as to instruct the user equipment to determine the relationship between the CSI-RS measurement resource and the SRS measurement resource based on the configuration information, thereby implementing uplink beam alignment and downlink beam alignment based on the relationship between the CSI-RS measurement resource and the SRS measurement resource by using one beam alignment procedure.

Step 203: When the user equipment receives the configuration information sent by the base station, the user equipment determines the CSI-RS measurement resource and the SRS measurement resource based on the configuration information.

The information that is included in the configuration information and that is used to indicate the relationship between the CSI-RS measurement resource and the SRS measurement resource may include various different types of information. Therefore, processes in which the user equipment determines the CSI-RS measurement resource and the SRS measurement resource also vary with different included information. The processes are separately described below.

Case 1: If the information used to indicate the relationship between the CSI-RS measurement resource and the SRS measurement resource includes the time offset or the time offset index of a time location of the CSI-RS measurement resource relative to the configuration moment, and the time offset or the time offset index of a time location of the SRS measurement resource relative to the configuration moment, step 203 is specifically determining the CSI-RS measurement resource based on the time offset or the time offset index of a time location of the CSI-RS measurement resource relative to the configuration moment; and determining the SRS measurement resource based on the time offset or the time offset index of a time location of the SRS measurement resource relative to the configuration moment.

For a correspondence between a time offset and a time offset index, refer to the description in step 201. When the configuration information includes information about a time offset index, the user equipment may determine a corresponding time offset based on the correspondence between a time offset and a time offset index. Therefore, the time offset is used as an example below to describe the process in which the user equipment determines the CSI-RS measurement resource and the SRS measurement resource.

For example, if the configuration moment is t, the time offset of a time location of the CSI-RS measurement resource relative to the configuration moment t is T1, and the time offset of the SRS measurement resource relative to the configuration moment t is T2, the CSI-RS measurement resource may be determined by the configuration moment t plus the time offset T1, and the SRS measurement resource may be determined by the configuration moment t plus the time offset T2. If T1 is less than T2, the relationship between the CSI-RS measurement resource and the SRS measurement resource may be shown in FIG. 7; or if T1 is greater than T2, the relationship between the CSI-RS measurement resource and the SRS measurement resource may be shown in FIG. 8.

Case 2: If the information used to indicate the relationship between the CSI-RS measurement resource and the SRS measurement resource includes the time offset of the CSI-RS measurement resource relative to the configuration moment, and the time offset of the SRS measurement resource relative to the CSI-RS measurement resource, step 203 is specifically determining the CSI-RS measurement resource based on the time offset or the time offset index of a time location of the CSI-RS measurement resource relative to the configuration moment; and determining the SRS measurement resource based on the CSI-RS measurement resource and the time offset or the time offset index of a time location of the SRS measurement resource relative to the CSI-RS measurement resource.

For example, if the configuration moment is t, the time offset of the CSI-RS measurement resource relative to the configuration moment t is T1, and the time offset of the SRS measurement resource relative to the CSI-RS measurement resource is T3, the CSI-RS measurement resource may be determined by the configuration moment t plus the time offset T1, and the SRS measurement resource may be determined by the configuration moment t plus the time offsets T1 and T3. The determined relationship between the CSI-RS measurement resource and the SRS measurement resource may be shown in FIG. 9.

Case 3: If the information used to indicate the relationship between the CSI-RS measurement resource and the SRS measurement resource includes the time offset of the SRS measurement resource relative to the configuration moment, and the time offset of the CSI-RS measurement resource relative to the SRS measurement resource, step 203 is specifically determining the SRS measurement resource based on the time offset or the time offset index of a time location of the SRS measurement resource relative to the configuration moment; and determining the CSI-RS measurement resource based on the SRS measurement resource and the time offset or the time offset index of a time location of the CSI-RS measurement resource relative to the SRS measurement resource.

For example, if the configuration moment is t, the time offset of the SRS measurement resource relative to the configuration moment t is T2, and the time offset of the CSI-RS measurement resource relative to the SRS measurement resource is T3, the SRS measurement resource may be determined by the configuration moment t plus the time offset T2, and the CSI-RS measurement resource may be determined by the configuration moment t plus the time offsets T2 and T3. The determined relationship between the CSI-RS measurement resource and the SRS measurement resource may be shown in FIG. 10.

Further, a time offset corresponding to a time offset index is a preset limited value. When configuring a reference signal, the base station configures a time offset index for the user equipment, and a time offset corresponding to the time offset index is a discrete value. A moment calculated by the user equipment based on the time offset determined by the time offset index may not be a time location of a reference signal measurement resource. Therefore, when the information used to indicate the relationship between the CSI-RS measurement resource and the SRS measurement resource includes the time offset index, and a corresponding calculated moment is not the time location of the reference signal measurement resource, the user equipment may use a reference signal measurement resource whose time location is after the time location and is closest to the time location as a reference signal measurement resource used for beam alignment.

Figure 12:
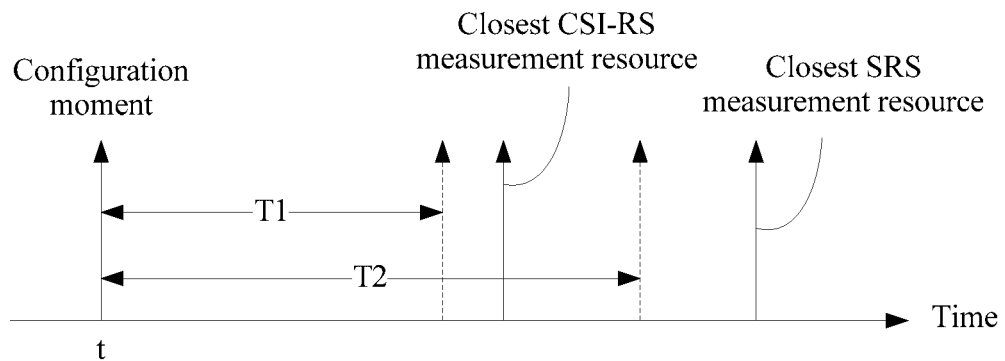
FIG. 12 is a schematic diagram of a fifth relationship between a CSI-RS measurement resource and an SRS measurement resource according to an embodiment of the present invention.
Figure 13:
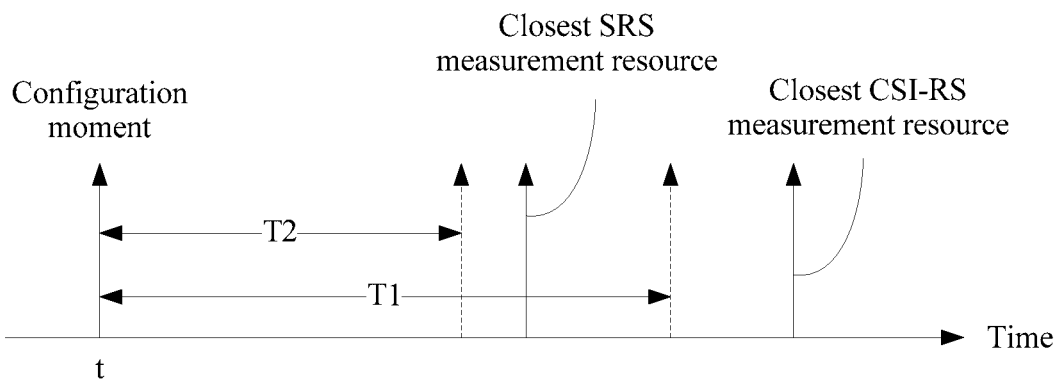
FIG. 13 is a schematic diagram of a sixth relationship between a CSI-RS measurement resource and an SRS measurement resource according to an embodiment of the present invention.

For example, in the first case, if the configuration moment t determined by the user equipment plus the time offset T1 is not a time location of the CSI-RS measurement resource, and the configuration moment t plus the time offset T2 is not a time location of the SRS measurement resource, when T1 is less than T2, the relationship between the CSI-RS measurement resource and the SRS measurement resource is shown in FIG. 12; or when T1 is greater than T2, the relationship between the CSI-RS measurement resource and the SRS measurement resource is shown in FIG. 13.

Figure 14:
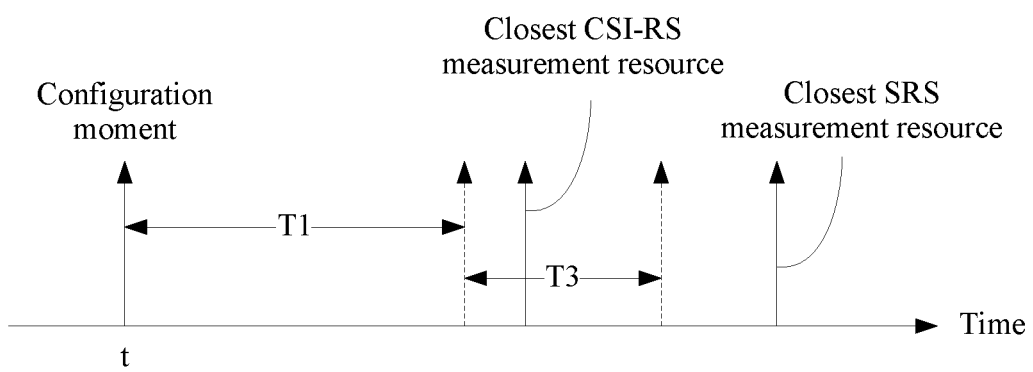
FIG. 14 is a schematic diagram of a seventh relationship between a CSI-RS measurement resource and an SRS measurement resource according to an embodiment of the present invention.

In the second case, if the configuration moment t determined by the user equipment plus the time offset T1 is not a time location of the CSI-RS measurement resource, and the configuration moment t plus the time offset T1 and the time offset T3 is not a time location of the SRS measurement resource, the relationship between the CSI-RS measurement resource and the SRS measurement resource is shown in FIG. 14.

Figure 15:
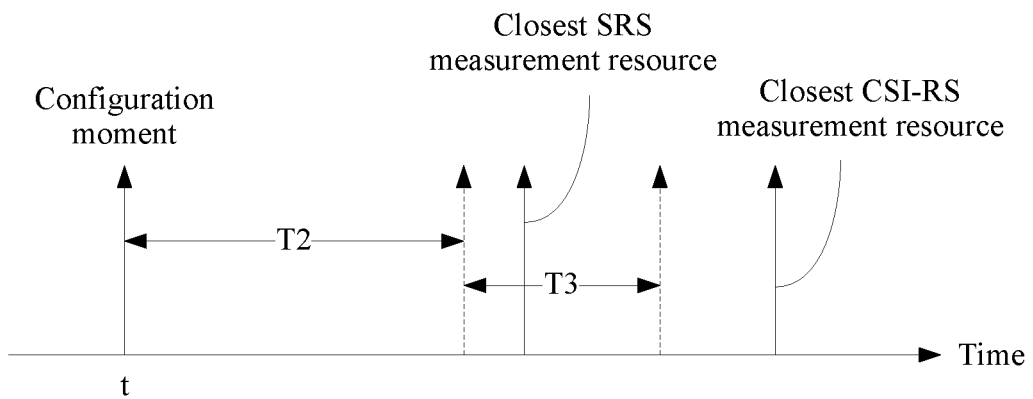
FIG. 15 is a schematic diagram of an eighth relationship between a CSI-RS measurement resource and an SRS measurement resource according to an embodiment of the present invention.

In the third case, if the configuration moment t determined by the user equipment plus the time offset T2 is not a time location of the SRS measurement resource, and the configuration moment t plus the time offset T2 and the time offset T3 is not a time location of the CSI-RS measurement resource, the relationship between the CSI-RS measurement resource and the SRS measurement resource is shown in FIG. 15.

In this embodiment of the present invention, the base station sends, to the user equipment by using the configuration information, the information used to indicate the relationship between the CSI-RS measurement resource and the SRS measurement resource, so as to associate the CSI-RS measurement resource and the SRS measurement resource that are used for beam alignment. In this way, the base station and the user equipment complete uplink beam alignment and downlink beam alignment in one beam alignment process, so as to reduce time-frequency resource overheads, thereby improving beam alignment efficiency.

Further, when a reference signal measurement resource is periodically configured or semi-statically configured, and the reference signal measurement resource may be the CSI-RS measurement resource or the SRS measurement resource, there are at least two measurement resources used for an SRS, and there are at least two measurement resources used for a CSI-RS. In this case, in the foregoing three cases, specific information of a time offset or a time offset index of a time location of the reference signal measurement resource relative to the configuration moment is different, and processes of determining the reference signal measurement resource based on the information are also different. The processes are separately described below.

If the time offset or the time offset index of a time location of the CSI-RS measurement resource relative to the configuration moment specifically includes a time offset or a time offset index of a time location of a first CSI-RS measurement resource relative to the configuration moment, and a resource index of at least one CSI-RS measurement resource, the determining the CSI-RS measurement resource based on the time offset or the time offset index of a time location of the CSI-RS measurement resource relative to the configuration moment includes: determining the first CSI-RS measurement resource based on the time offset or the time offset index of a time location of the first CSI-RS measurement resource relative to the configuration moment; and determining the at least one CSI-RS measurement resource based on the first CSI-RS measurement resource and the resource index of the at least one CSI-RS measurement resource.

If the time offset or the time offset index of a time location of the SRS measurement resource relative to the configuration moment specifically includes a time offset or a time offset index of a time location of a first SRS measurement resource relative to the configuration moment, and a resource index of at least one SRS measurement resource, the determining the SRS measurement resource based on the time offset or the time offset index of a time location of the SRS measurement resource relative to the configuration moment includes: determining the first SRS measurement resource based on the time offset or the time offset index of a time location of the first SRS measurement resource relative to the configuration moment; and determining the at least one SRS measurement resource based on the first SRS measurement resource and the resource index of the at least one SRS measurement resource.

When a reference signal measurement resource is periodically configured or semi-statically configured, the periodic or semi-static reference signal measurement resource determined by the user equipment based on the configuration information is shown in FIG. 11. The reference signal measurement resource in FIG. 11 may be the CSI-RS measurement resource or the SRS measurement resource.

Figure 16:
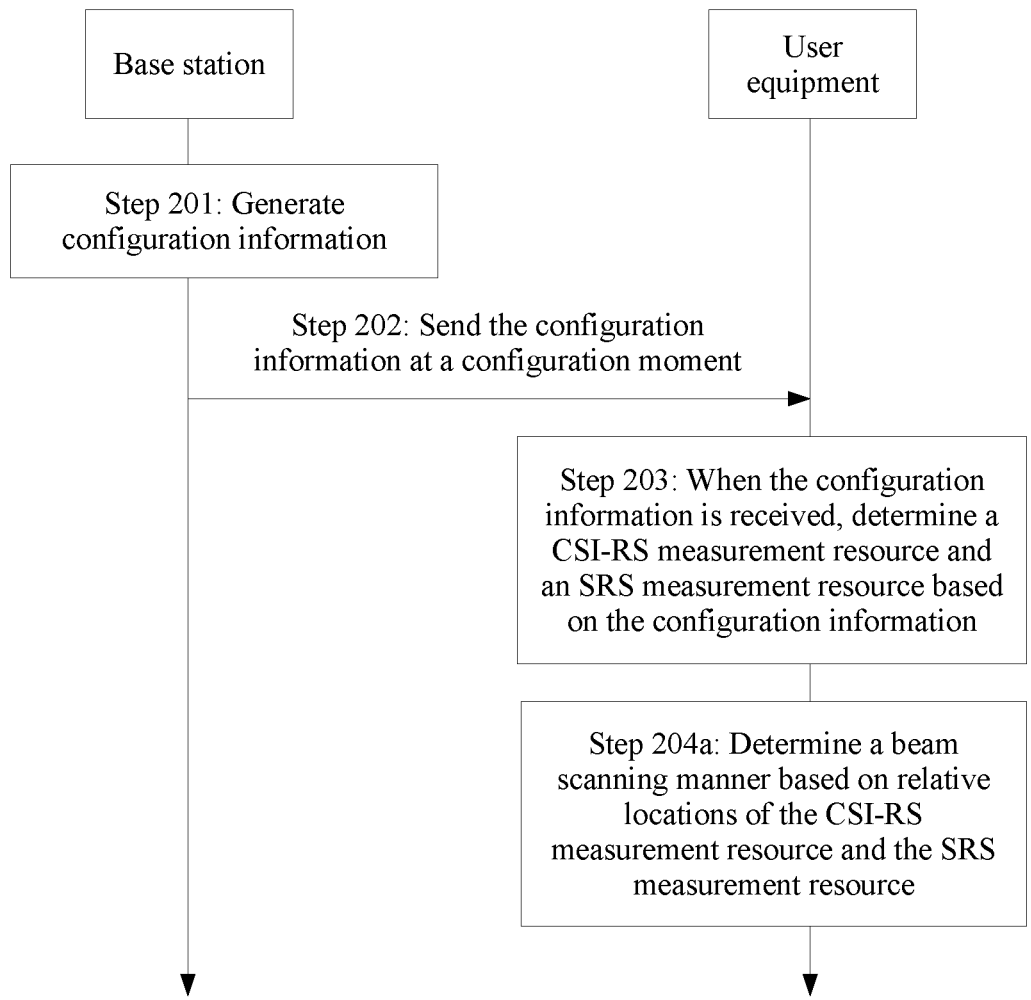
FIG. 16 is a flowchart of another configuration resource indication method according to an embodiment of the present invention.

Further, referring to FIG. 16, the method includes step 204*a*. Step 204*a* corresponds to the step of implicitly indicating the beam scanning manner in the beam alignment process by the base station.

Step 204*a*: The user equipment determines a beam scanning manner based on relative locations of the CSI-RS measurement resource and the SRS measurement resource.

Step 204*a* is after step 203. To be specific, after the user equipment determines the CSI-RS measurement resource and the SRS measurement resource based on the configuration information, if the user equipment determines that the SRS measurement resource is before the CSI-RS measurement resource, the user equipment may determine that the beam scanning manner in the beam alignment process is a first scanning manner; or if the user equipment determines that the CSI-RS measurement resource is before the SRS measurement resource, the user equipment may determine that the beam scanning manner in the beam alignment process is a second scanning manner.

Figure 17:
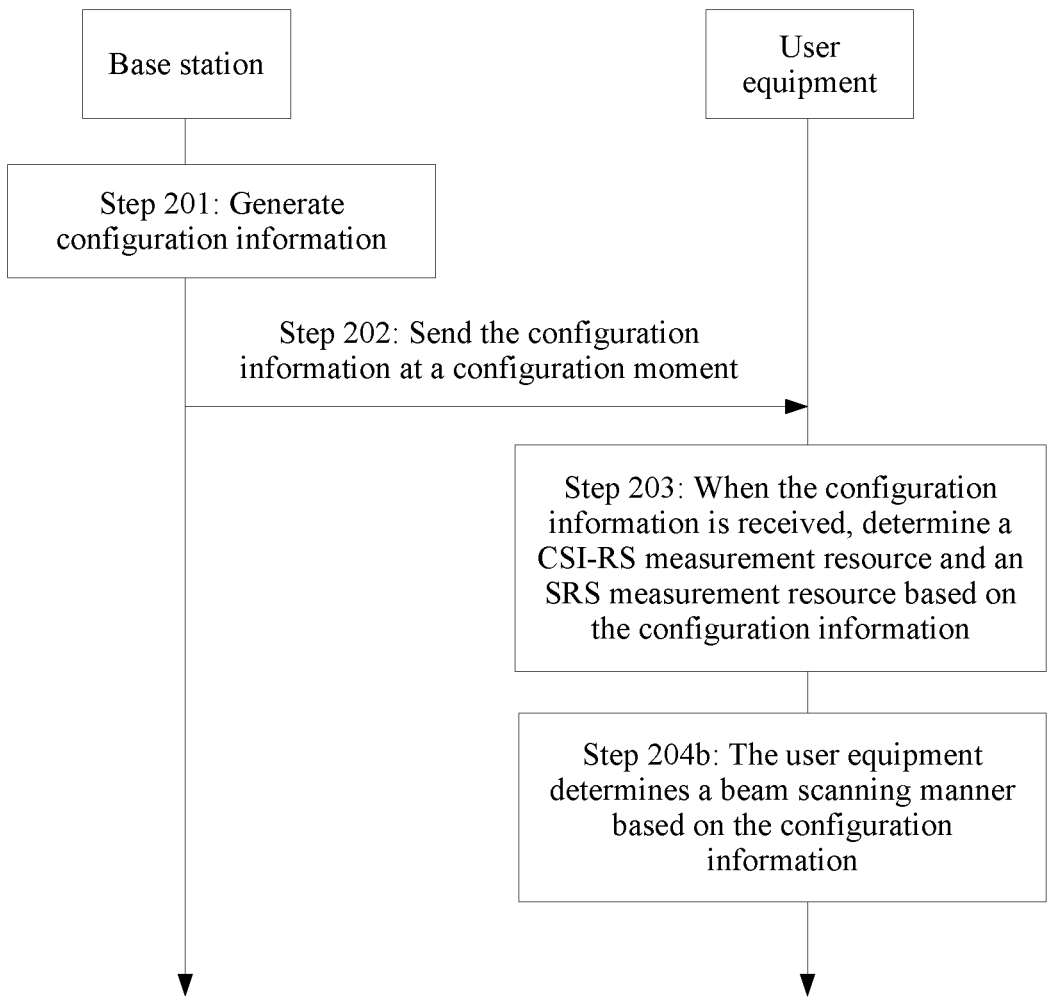
FIG. 17 is a flowchart of still another configuration resource indication method according to an embodiment of the present invention.

Further, referring to FIG. 17, the method includes step 204*b*. If the configuration information further includes information used to indicate relative locations of the CSI-RS measurement resource and the SRS measurement resource, step 204*b* corresponds to the step of implicitly indicating the beam scanning manner in the beam alignment process by the base station. If the configuration information further includes information used to indicate a beam scanning manner, step 204*b* corresponds to the step of explicitly indicating the beam scanning manner in the beam alignment process by the base station.

Step 204*b*: The user equipment determines a beam scanning manner based on the configuration information.

When the user equipment receives the configuration information, the user equipment may directly determine the beam scanning manner of the user equipment according to step 204*b*.

Specifically, when the configuration information indicates that the SRS measurement resource is before the CSI-RS measurement resource, the user equipment may determine that the beam scanning manner in the beam alignment process is a first scanning manner. When the configuration information indicates that the CSI-RS measurement resource is before the SRS measurement resource, the user equipment may determine that the beam scanning manner in the beam alignment process is a second scanning manner.

When the configuration information includes the information used to indicate the beam scanning manner, the user equipment may directly determine, based on the information used to indicate the beam scanning manner, that the beam scanning manner is the first scanning manner or the second scanning manner.

Further, when determining the CSI-RS measurement resource, the SRS measurement resource, and the beam scanning manner in the beam alignment process, the base station and the user equipment may perform beam alignment based on the CSI-RS measurement resource, the SRS measurement resource, and the corresponding beam scanning manner, that is, implement uplink and downlink beam alignment in one beam alignment process. Processes in which the base station and the user equipment perform beam alignment in the first scanning manner and the second scanning manner are separately described below in detail.

Figure 18:
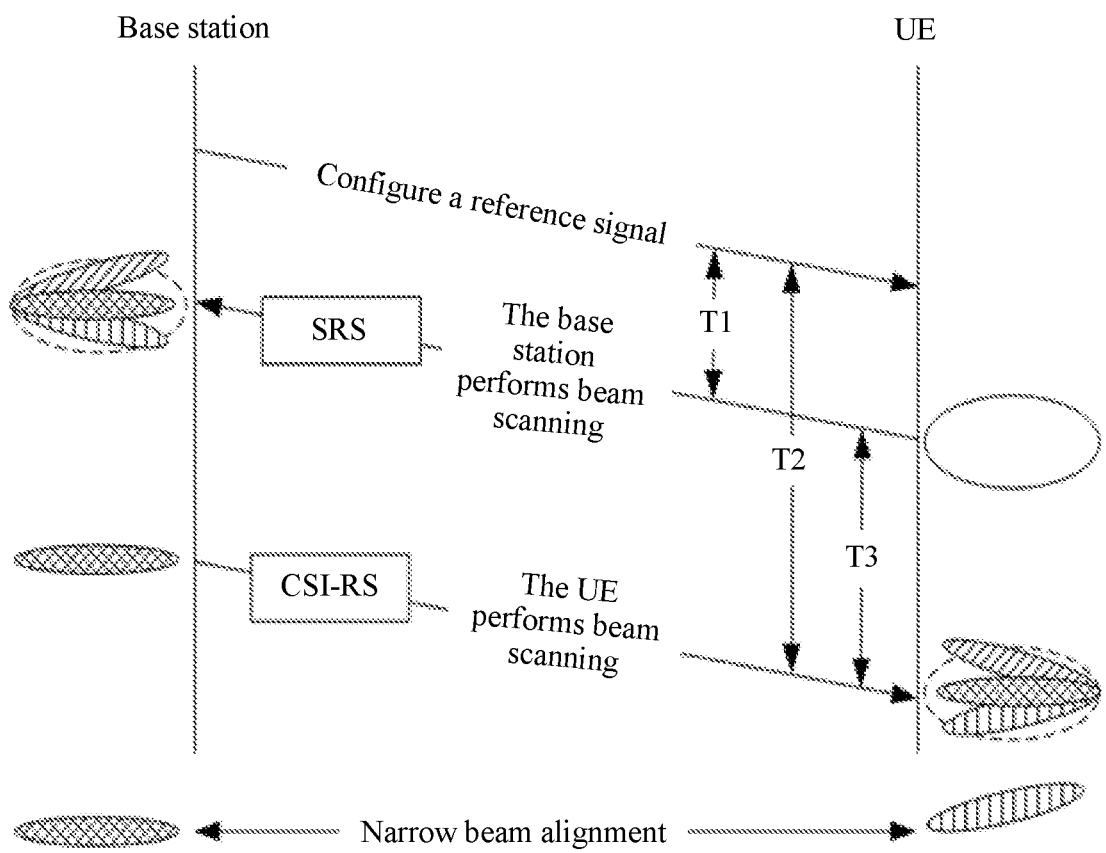
FIG. 18 is a schematic diagram of a beam alignment procedure according to an embodiment of the present invention.

First scanning manner: As shown in FIG. 18, if the SRS measurement resource is before the CSI-RS measurement resource, the base station and the user equipment perform beam alignment in the first scanning manner, and a process of performing beam alignment may specifically include step a1 to step a4.

Step a1: The user equipment sends an SRS on the SRS measurement resource by using a first wide beam.

The first wide beam is a beam that is obtained after coarse beam alignment is performed between the base station and the user equipment and that has a relatively wide receive and transmit angle, and the first wide beam is a beam on a user equipment side. A beam that is obtained after coarse beam alignment is performed on a base station side and that has a relatively wide receive and transmit angle may be referred to as a second wide beam. The first wide beam and the second wide beam are a group of aligned wide beams.

Step a2: The base station receives the SRS by using a first beam set on the SRS measurement resource and measures reference signal received power (RSRP) of the SRS by using the first beam set on the SRS measurement resource, and determines a second beam set based on RSRP corresponding to each beam in the first beam set. The second beam set is a subset of the first beam set. An example in which the second beam set includes one beam is used for description in FIG. 11.

The first beam set may include two or more narrow beams, and a range of a receive and transmit angle of each narrow beam included in the first beam set is less than a range of a receive and transmit angle of the second wide beam. For example, the receive and transmit angle of the second wide beam ranges from 20 degrees to 40 degrees. If the first beam set includes four narrow beams, receive and transmit angles corresponding to the four narrow beams may respectively range from 20 degrees to 25 degrees, from 25 degrees to 30 degrees, from 30 degrees to 35 degrees, and from 35 degrees to 40 degrees.

In addition, there may be a correspondence between the SRS measurement resource and the narrow beam included in the first beam set. For example, in a correspondence between the SRS measurement resource shown in FIG. 11 and the narrow beam included in the first beam set, one SRS measurement resource may be divided into four parts, and each part is corresponding to one narrow beam in the first beam set.

When the user equipment sends the SRS by using the first wide beam on the SRS measurement resource, at a same moment, the base station may correspondingly receive the SRS on the SRS measurement resource by using the first beam set and based on the correspondence between the SRS measurement resource and the narrow beam included in the first beam set, measure RSRP, of the SRS, corresponding to each narrow beam, and determine the second beam set from the first beam set in descending order of the RSRP. The second beam set is a subset of the first beam set.

Step a3: The base station sends a CSI-RS on the CSI-RS measurement resource by using each beam in the second beam set.

After the base station determines the second beam set, the base station may send the CSI-RS on the CSI-RS measurement resource based on an association relationship between the CSI-RS measurement resource and the SRS measurement resource by using each beam in the second beam set.

For example, as shown in FIG. 18, an example in which the base station sends the CSI-RS on the CSI-RS measurement resource by using one beam in the second beam set is used. The association relationship between the CSI-RS measurement resource and the SRS measurement resource is as follows: A time interval between the CSI-RS measurement resource and the SRS measurement resource is T3. In this case, after determining the second beam set, the base station sends the CSI-RS on the CSI-RS measurement resource after the time T3 by using one beam in the second beam set on.

Step a4: The user equipment receives the CSI-RS by using a third beam set on the CSI-RS measurement resource and measures RSRP of the CSI-RS by using the third beam set on the CSI-RS measurement resource, and determines a fourth beam set based on RSRP corresponding to each beam in the third beam set.

The third beam set may include two or more narrow beams, and a range of a receive and transmit angle of each narrow beam included in the third beam set is less than a range of the receive and transmit angle of the first wide beam. For example, the receive and transmit angle of the first wide beam ranges from 35 degrees to 55 degrees. If the third beam set includes four narrow beams, receive and transmit angles corresponding to the four narrow beams may respectively range from 35 degrees to 40 degrees, from 40 degrees to 45 degrees, from 45 degrees to 50 degrees, and from 50 degrees to 55 degrees.

In addition, there may be a correspondence between the CSI-RS measurement resource and the narrow beam included in the third beam set, and the correspondence may be configured by the base station for the user equipment. For example, the base station configures, for the user equipment by using configuration information, the correspondence between the CSI-RS measurement resource and the narrow beam included in the third beam set.

When the base station sends the CSI-RS on the CSI-RS measurement resource by using one beam in the second beam set, at a same moment, the user equipment may correspondingly receive the CSI-RS by using the third beam set on the CSI-RS measurement resource, measure RSRP, of the CSI-RS, corresponding to each narrow beam included in the third beam set, and determine a beam corresponding to maximum RSRP as a beam in the fourth beam set.

Similarly, for each beam in the second beam set, the user equipment selects, by using the method described in step a4, a beam corresponding to maximum RSRP from the third beam set. Therefore, after the base station sends the CSI-RS by using each beam set in the second beam set, the user equipment may determine and obtain the fourth beam set from the third beam set.

Figure 19:
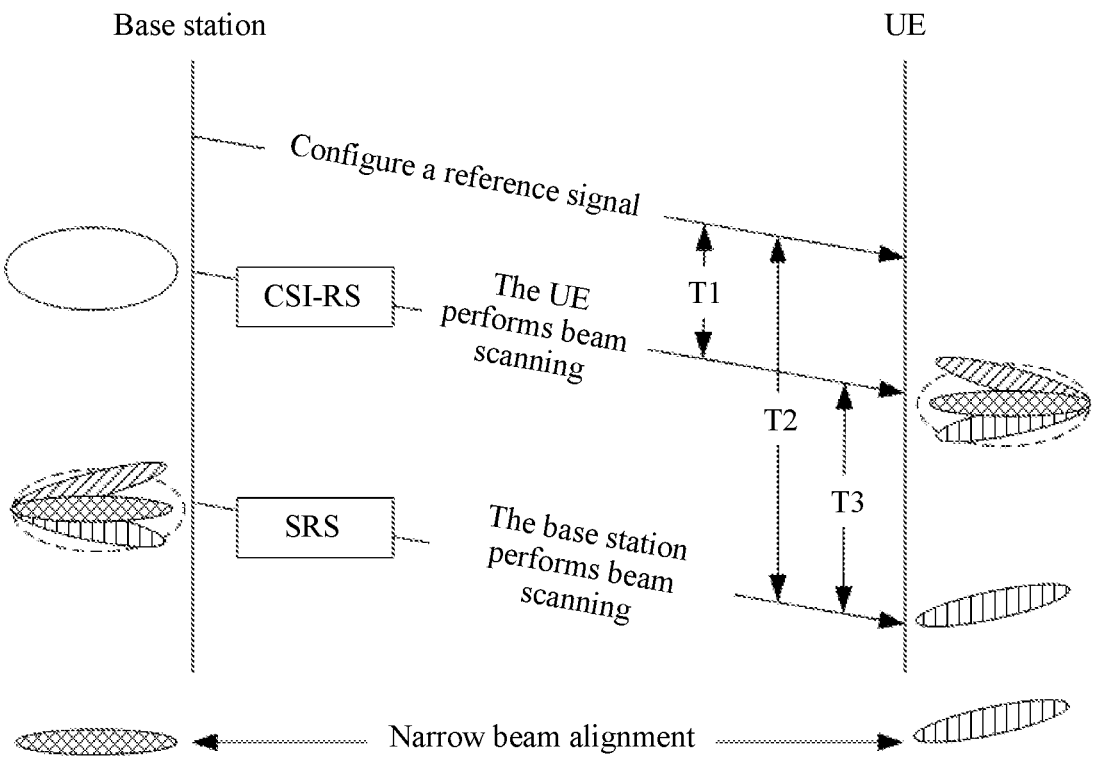
FIG. 19 is a schematic diagram of another beam alignment procedure according to an embodiment of the present invention.

Second scanning manner: As shown in FIG. 19, if the SRS measurement resource is before the CSI-RS measurement resource, the base station and the user equipment perform beam alignment in the second scanning manner, and a process of performing beam alignment may specifically include step b1 to step b4.

Step b1: The base station sends on the CSI-RS measurement resource a CSI-RS by using a first wide beam.

Step b2: The user equipment receives the CSI-RS by using a third beam set on the CSI-RS measurement resource and measures RSRP of the CSI-RS by using the third beam set on the CSI-RS measurement resource, and determines a fourth beam set based on RSRP corresponding to each beam in the third beam set. The fourth beam set is a subset of the third beam set. An example in which the fourth beam set includes one beam is used for description in FIG. 19.

Step b3: The user equipment sends an SRS on the SRS measurement resource by using each beam in the fourth beam set.

Step b4: The base station separately receives the SRS by using a first beam set on the SRS measurement resource and measures RSRP of the SRS by using the first beam set on the SRS measurement resource, and determines a second beam set based on RSRP corresponding to each beam in the first beam set.

It should be noted that the first scanning manner means that the user equipment first performs beam scanning, and then the base station performs beam scanning, and the second scanning manner means that the base station first performs beam scanning, and then the user equipment performs beam scanning. However, a process of the first scanning manner is similar to that of the second scanning manner. The first wide beam, the first beam set, the second beam set, the third beam set, the fourth beam set, and the like in the second scanning manner are the same as those in the first scanning manner. For details, refer to the description of the first scanning manner. Details are not described herein again in this embodiment of the present invention.

In the embodiments of the present invention, the base station sends, to the user equipment by using the configuration information, the information used to indicate the relationship between the CSI-RS measurement resource and the SRS measurement resource, so as to associate the CSI-RS measurement resource and the SRS measurement resource that are used for beam alignment. In this way, the base station and the user equipment complete uplink beam alignment and downlink beam alignment in one beam alignment process, so as to reduce time-frequency resource overheads, thereby improving beam alignment efficiency, and also reducing signaling overheads for configuring an SRS and/or a CSI-RS by the base station.

The foregoing mainly describes the solutions provided in the embodiments of the present invention from a perspective of interaction between network elements. It may be understood that to implement the foregoing functions, the network elements such as the base station and the user equipment, each include a corresponding hardware structure and/or software module for performing the functions. A person skilled in the art should easily be aware that in combination with the example network elements and algorithm steps described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the base station, the user equipment, and the like may be divided into function modules based on the foregoing method examples.

For example, each function module may be obtained through division based on each corresponding function, or two or more functions may be integrated into one processing module. The integrated module may be implemented in a form of hardware, or may be implemented in a form of a software function module. It should be noted that in the embodiments of the present invention, module division is an example, and is merely logical function division. In actual implementation, another division manner may be used.

Figure 20:
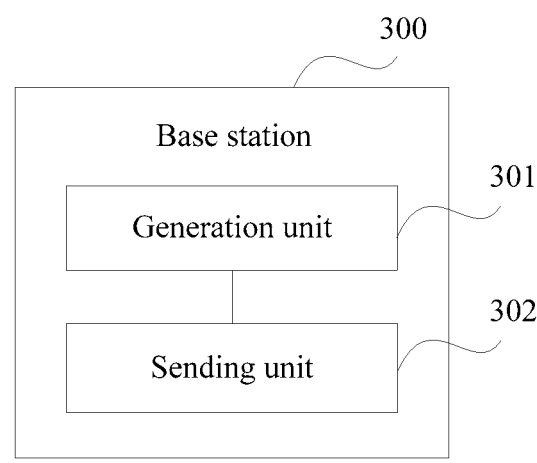
FIG. 20 is a schematic structural diagram of a base station according to an embodiment of the present invention.

When each function module is obtained through division based on each corresponding function, FIG. 20 is a possible schematic structural diagram of a base station 300 in the foregoing embodiment. The base station 300 includes a generation unit 301 and a sending unit 302. The generation unit 301 is configured to perform step 201 in FIG. 6, FIG. 16, or FIG. 17. The sending unit 302 is configured to perform step 202 in FIG. 6, FIG. 16, or FIG. 17. All related content of the steps in the foregoing method embodiments may be cited in function descriptions of corresponding function modules, and details are not described herein again.

In hardware implementation, the generation unit 301 may be a processor, and the sending unit 302 may be a transmitter. The transmitter and a receiver may form a communications interface.

Figure 21:
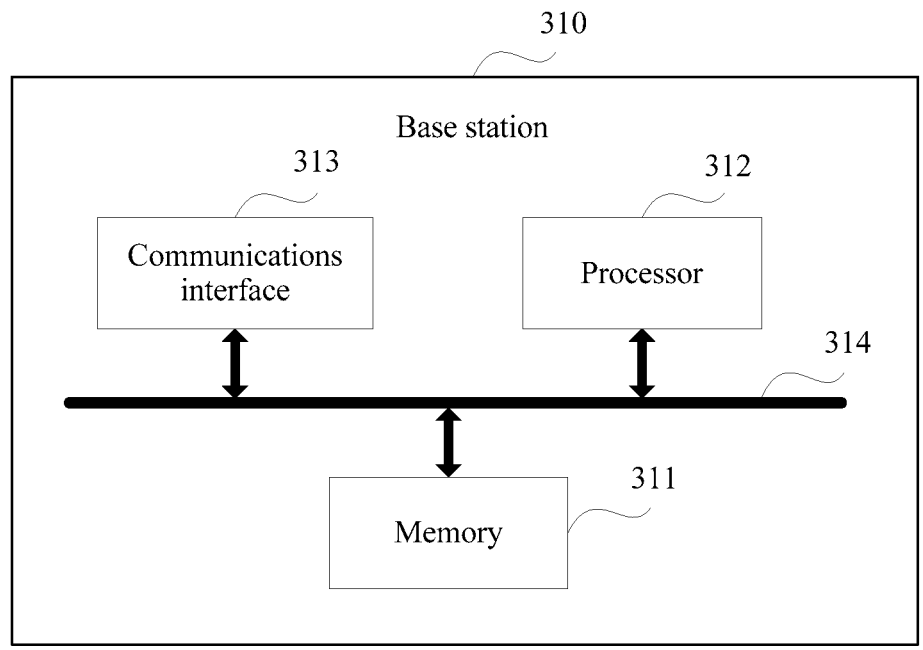
FIG. 21 is a schematic structural diagram of another base station according to an embodiment of the present invention.

FIG. 21 is a possible schematic logical structure diagram of a base station 310 in the foregoing embodiment according to an embodiment of the present invention. The base station 310 includes a processor 312, a communications interface 313, a memory 311, and a bus 314. The processor 312, the communications interface 313, and the memory 311 are connected to each other by using the bus 314. In this embodiment of the present invention, the processor 312 is configured to control and manage an action of the base station 310. For example, the processor 312 is configured to perform step 201 in FIG. 6, FIG. 16, or FIG. 17, and/or another process of the technology described in this specification. The communications interface 313 is configured to support the base station 310 in performing communication. The memory 311 is configured to store program code and data of the base station 310.

The processor 312 may be a central processing unit, a general-purpose processor, a digital signal processor, an application-specific integrated circuit, a field programmable gate array or another programmable logic device, a transistor logic device, a hardware component, or any combination thereof. The processor 312 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 314 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 21, but this does not mean that there is only one bus or only one type of bus.

Figure 22:
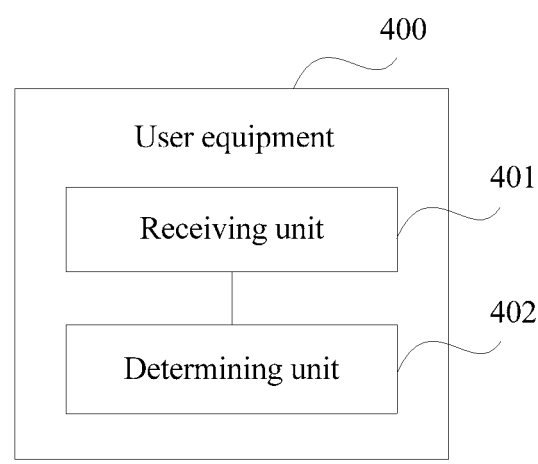
FIG. 22 is a schematic structural diagram of user equipment according to an embodiment of the present invention.

When each function module is obtained through division based on each corresponding function, FIG. 22 is a possible schematic structural diagram of user equipment 400 in the foregoing embodiment. The user equipment 400 includes a receiving unit 401 and a determining unit 402. The receiving unit 401 is configured to perform a process of receiving configuration information in FIG. 6, FIG. 16, or FIG. 17. The determining unit 402 is configured to perform step 203 in FIG. 6, FIG. 16, or FIG. 17, and step 204a in FIG. 16 or step 204b in FIG. 17. All related content of the steps in the foregoing method embodiments may be cited in function descriptions of corresponding function modules, and details are not described herein again.

In hardware implementation, the determining unit 402 may be a processor, and the receiving unit 401 may be a receiver. The receiver and a transmitter may form a communications interface.

Figure 23:
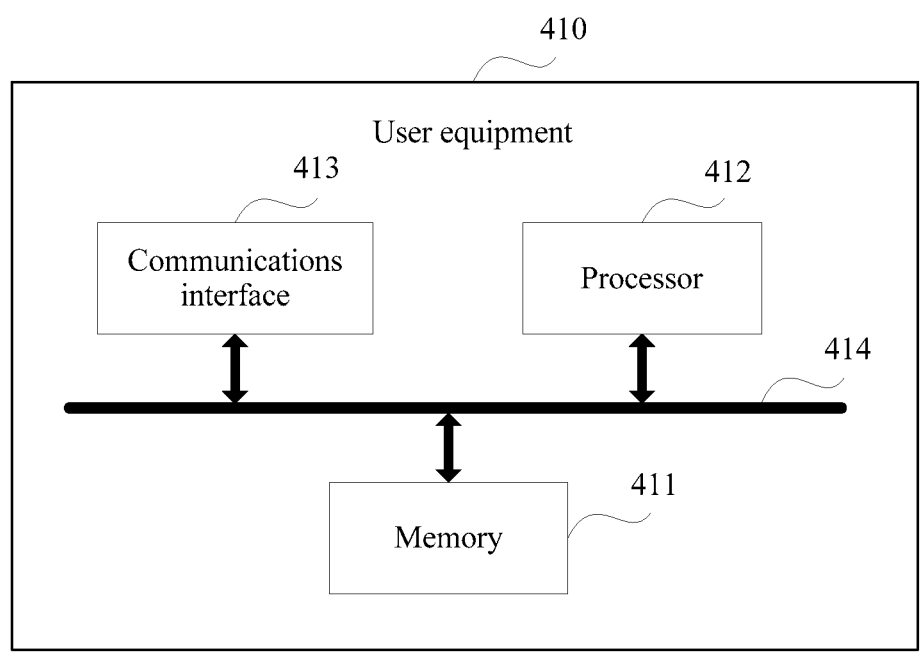
FIG. 23 is a schematic structural diagram of another user equipment according to an embodiment of the present invention.

FIG. 23 is a possible schematic logical structure diagram of user equipment 410 in the foregoing embodiment according to an embodiment of the present invention. The user equipment 410 includes a processor 412, a communications interface 413, a memory 411, and a bus 414. The processor 412, the communications interface 413, and the memory 411 are connected to each other by using the bus 414. In this embodiment of the present invention, the processor 412 is configured to control and manage an action of the user equipment 410. For example, the processor 412 is configured to perform step 203 in FIG. 6, FIG. 16, or FIG. 17, step 204a in FIG. 16, step 204b in FIG. 17, and/or another process of the technology described in this specification. The communications interface 413 is configured to support the user equipment 410 in performing communication. The memory 411 is configured to store program code and data of the user equipment 410.

The processor 412 may be a central processing unit, a general-purpose processor, a digital signal processor, an application-specific integrated circuit, a field programmable gate array or another programmable logic device, a transistor logic device, a hardware component, or any combination thereof. The processor 412 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 414 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 23, but this does not mean that there is only one bus or only one type of bus.

In another embodiment of the present invention, a computer readable storage medium is further provided. The computer readable storage medium stores a computer executable instruction, and when at least one processor of a device executes the computer executable instruction, the device performs the steps of the base station in the configuration resource indication method shown in FIG. 6, FIG. 16, or FIG. 17, or performs the steps of the user equipment in the configuration resource indication method shown in FIG. 6, FIG. 16, or FIG. 17.

In another embodiment of the present invention, a computer program product is further provided. The computer program product includes a computer executable instruction, and the computer executable instruction is stored in a computer readable storage medium. At least one processor of a device may read the computer executable instruction from the computer readable storage medium, and the at least one processor executes the computer executable instruction, so that the device performs the steps of the base station in the configuration resource indication method shown in FIG. 6, FIG. 16, or FIG. 17, or performs the steps of the user equipment in the configuration resource indication method shown in FIG. 6, FIG. 16, or FIG. 17.

In another embodiment of the present invention, a communications system is further provided. The communications system includes a base station and user equipment. The base station is the base station shown in FIG. 20 or FIG. 21, and is configured to perform the steps of the base station in the configuration resource indication method shown in FIG. 6, FIG. 16, or FIG. 17; and/or the user equipment is the user equipment shown in FIG. 22 or FIG. 23.

In the embodiments of the present invention, the base station sends, to the user equipment by using the configuration information, the information used to indicate the relationship between the CSI-RS measurement resource and the SRS measurement resource, so as to associate the CSI-RS measurement resource and the SRS measurement resource that are used for beam alignment. In this way, the base station and the user equipment complete uplink beam alignment and downlink beam alignment in one beam alignment process, so as to reduce time-frequency resource overheads, thereby improving beam alignment efficiency, and also reducing signaling overheads for configuring an SRS and/or a CSI-RS by the base station.

It should be finally noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A configuration resource indication method, wherein the method comprises:
    receiving, by user equipment, configuration information from a network device, wherein the configuration information comprises information used to indicate a relationship between a channel state information-reference signal (CSI-RS) measurement resource and a sounding reference signal (SRS) measurement resource; and
    determining the CSI-RS measurement resource and the SRS measurement resource based on the configuration information, wherein if a third beam set is a beam set used by the user equipment to receive the CSI-RS and a fourth beam set is a beam set used by the user equipment to send the SRS, the fourth beam set is a subset of the third beam set.

2. The method according to claim 1, wherein the configuration information further comprises:
    at least one of configuration information of one or more SRS measurement resources, or configuration information of one or more CSI-RS measurement resources.

3. The method according to claim 1, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the configuration moment, the determining the CSI-RS measurement resource and the SRS measurement resource based on the configuration information comprises:
    determining the CSI-RS measurement resource based on the time offset or the time offset index of the time location of the CSI-RS measurement resource relative to the configuration moment; and
    determining the SRS measurement resource based on the time offset or the time offset index of the time location of the SRS measurement resource relative to the configuration moment.

4. The method according to claim 3, wherein:
    when a reference signal measurement resource is periodically configured or semi-statically configured and the reference signal measurement resource is the CSI-RS measurement resource or the SRS measurement resource, at least two measurement resources are used for an SRS and at least two measurement resources are used for a CSI-RS; and
    if the time offset or the time offset index of the time location of the CSI-RS measurement resource relative to the configuration moment comprises a time offset or a time offset index of a time location of a first CSI-RS measurement resource relative to the configuration moment and a resource index of at least one CSI-RS measurement resource, the determining the CSI-RS measurement resource based on the time offset or the time offset index of the time location of the CSI-RS measurement resource relative to the configuration moment comprises:
        determining the first CSI-RS measurement resource based on the time offset or the time offset index of the time location of the first CSI-RS measurement resource relative to the configuration moment; and
        determining the at least one CSI-RS measurement resource based on the first CSI-RS measurement resource and the resource index of the at least one CSI-RS measurement resource; or
    if the time offset or the time offset index of the time location of the SRS measurement resource relative to the configuration moment comprises a time offset or a time offset index of a time location of a first SRS measurement resource relative to the configuration moment and a resource index of at least one SRS measurement resource, the determining the SRS measurement resource based on the time offset or the time offset index of the time location of the SRS measurement resource relative to the configuration moment comprises:
        determining the first SRS measurement resource based on the time offset or the time offset index of the time location of the first SRS measurement resource relative to the configuration moment; and
        determining the at least one SRS measurement resource based on the first SRS measurement resource and the resource index of the at least one SRS measurement resource.

5. The method according to claim 1, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the CSI-RS measurement resource, the determining the CSI-RS measurement resource and the SRS measurement resource based on the configuration information comprises:
    determining the CSI-RS measurement resource based on the time offset or the time offset index of the time location of the CSI-RS measurement resource relative to the configuration moment; and
    determining the SRS measurement resource based on the CSI-RS measurement resource and the time offset or the time offset index of the time location of the SRS measurement resource relative to the CSI-RS measurement resource.

6. The method according to claim 1, wherein if the information used to indicate the relationship between the CSI-RS measurement resource and the SRS measurement resource comprises a time offset or a time offset index of a time location of the SRS measurement resource relative to a configuration moment and a time offset or a time offset index of a time location of the CSI-RS measurement resource relative to the SRS measurement resource, the determining the CSI-RS measurement resource and the SRS measurement resource based on the configuration information comprises:
   determining the SRS measurement resource based on the time offset or the time offset index of the time location of the SRS measurement resource relative to the configuration moment; and
   determining the CSI-RS measurement resource based on the SRS measurement resource and the time offset or the time offset index of the time location of the CSI-RS measurement resource relative to the SRS measurement resource.

7. The method according to claim 1, wherein after the determining the CSI-RS measurement resource and the SRS measurement resource based on the configuration information, the method further comprises:
   determining a beam scanning manner of the user equipment based on relative locations of the CSI-RS measurement resource and the SRS measurement resource; or
   if the configuration information further comprises information used to indicate relative locations of the CSI-RS measurement resource and the SRS measurement resource, the method further comprises determining a beam scanning manner of the user equipment based on the configuration information.

8. User equipment, wherein the user equipment comprises:
   a receiver, the receiver configured to receive configuration information from a network device, wherein the configuration information comprises information used to indicate a relationship between a channel state information-reference signal (CSI-RS) measurement resource and a sounding reference signal (SRS) measurement resource; and
   at least one processor, the at least one processor configured to determine the CSI-RS measurement resource and the SRS measurement resource based on the configuration information, wherein if a third beam set is a beam set used by the user equipment to receive the CSI-RS and a fourth beam set is a beam set used by the user equipment to send the SRS, the fourth beam set is a subset of the third beam set.

9. The user equipment according to claim 8, wherein the configuration information further comprises:
   at least one of configuration information of one or more SRS measurement resources, or configuration information of one or more CSI-RS measurement resources.

10. The user equipment according to claim 8, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the configuration moment, the at least one processor is configured to:
   determine the CSI-RS measurement resource based on the time offset or the time offset index of the time location of the CSI-RS measurement resource relative to the configuration moment; and
   determine the SRS measurement resource based on the time offset or the time offset index of the time location of the SRS measurement resource relative to the configuration moment.

11. The user equipment according to claim 10, wherein:
   when a reference signal measurement resource is periodically configured or semi-statically configured and the reference signal measurement resource is the CSI-RS measurement resource or the SRS measurement resource, at least two measurement resources are used for the SRS and at least two measurement resources are used for the CSI-RS; and
   if the time offset or the time offset index of the CSI-RS measurement resource relative to the configuration moment comprises a time offset or a time offset index of a first CSI-RS measurement resource relative to the configuration moment and a resource index of at least one CSI-RS measurement resource, the at least one processor is further configured to:
      determine the first CSI-RS measurement resource based on the time offset or the time offset index of the first CSI-RS measurement resource relative to the configuration moment; and
      determine the at least one CSI-RS measurement resource based on the first CSI-RS measurement resource and the resource index of the at least one CSI-RS measurement resource; or
   if the time offset or the time offset index of the SRS measurement resource relative to the configuration moment comprises a time offset or a time offset index of a first SRS measurement resource relative to the configuration moment and a resource index of at least one SRS measurement resource, the at least one processor is further configured to:
      determine the first SRS measurement resource based on the time offset or the time offset index of the first SRS measurement resource relative to the configuration moment; and
      determine the at least one SRS measurement resource based on the first SRS measurement resource and the resource index of the at least one SRS measurement resource.

12. The user equipment according to claim 8, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the CSI-RS measurement resource, the at least one processor is configured to:
   determine the CSI-RS measurement resource based on the time offset or the time offset index of the time location of the CSI-RS measurement resource relative to the configuration moment; and
   determine the SRS measurement resource based on the CSI-RS measurement resource and the time offset or the time offset index of the time location of the SRS measurement resource relative to the CSI-RS measurement resource.

13. The user equipment according to claim 8, wherein if the information used to indicate the relationship between the CSI-RS measurement resource and the SRS measurement resource comprises a time offset or a time offset index of a time location of the SRS measurement resource relative to a configuration moment and a time offset or a time offset index of a time location of the CSI-RS measurement resource relative to the SRS measurement resource, the at least one processor is configured to:
    determine the SRS measurement resource based on the time offset or the time offset index of the time location of the SRS measurement resource relative to the configuration moment; and
    determine the CSI-RS measurement resource based on the SRS measurement resource and the time offset or the time offset index of the time location of the CSI-RS measurement resource relative to the SRS measurement resource.

14. The user equipment according to claim 8, wherein:
    the at least one processor is further configured to determine a beam scanning manner of the user equipment based on relative locations of the CSI-RS measurement resource and the SRS measurement resource; or
    if the configuration information further comprises information used to indicate the relative locations of the CSI-RS measurement resource and the SRS measurement resource, the at least one processor is further configured to determine a beam scanning manner of the user equipment based on the configuration information.

15. A non-transitory computer-readable medium, comprising computer executable instructions stored on the non-transitory computer-readable medium, wherein when the instructions are executed by at least one processor, causes the at least one processor to:
    receive configuration information from a network device, wherein the configuration information comprises information used to indicate a relationship between a channel state information-reference signal (CSI-RS) measurement resource and a sounding reference signal (SRS) measurement resource; and
    determine the CSI-RS measurement resource and the SRS measurement resource based on the configuration information, wherein if a third beam set is a beam set used to receive the CSI-RS and a fourth beam set is a beam set used to send the SRS, the fourth beam set is a subset of the third beam set.

16. The non-transitory computer-readable medium according to claim 15, wherein the configuration information further comprises:
    at least one of configuration information of one or more SRS measurement resources, or configuration information of one or more CSI-RS measurement resources.

17. The non-transitory computer-readable medium according to claim 15, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the configuration moment, the determining the CSI-RS measurement resource and the SRS measurement resource based on the configuration information comprises:
    determining the CSI-RS measurement resource based on the time offset or the time offset index of the time location of the CSI-RS measurement resource relative to the configuration moment; and
    determining the SRS measurement resource based on the time offset or the time offset index of the time location of the SRS measurement resource relative to the configuration moment.

18. The non-transitory computer-readable medium according to claim 17, wherein:
    when a reference signal measurement resource is periodically configured or semi-statically configured and the reference signal measurement resource is the CSI-RS measurement resource or the SRS measurement resource, at least two measurement resources are used for an SRS and at least two measurement resources are used for a CSI-RS; and
    if the time offset or the time offset index of the time location of the CSI-RS measurement resource relative to the configuration moment comprises a time offset or a time offset index of a time location of a first CSI-RS measurement resource relative to the configuration moment and a resource index of at least one CSI-RS measurement resource, the determining the CSI-RS measurement resource based on the time offset or the time offset index of the time location of the CSI-RS measurement resource relative to the configuration moment comprises:
        determining the first CSI-RS measurement resource based on the time offset or the time offset index of the time location of the first CSI-RS measurement resource relative to the configuration moment; and
        determining the at least one CSI-RS measurement resource based on the first CSI-RS measurement resource and the resource index of the at least one CSI-RS measurement resource; or
    if the time offset or the time offset index of the time location of the SRS measurement resource relative to the configuration moment comprises a time offset or a time offset index of a time location of a first SRS measurement resource relative to the configuration moment and a resource index of at least one SRS measurement resource, the determining the SRS measurement resource based on the time offset or the time offset index of the time location of the SRS measurement resource relative to the configuration moment comprises:
        determining the first SRS measurement resource based on the time offset or the time offset index of the time location of the first SRS measurement resource relative to the configuration moment; and
        determining the at least one SRS measurement resource based on the first SRS measurement resource and the resource index of the at least one SRS measurement resource.

19. The non-transitory computer-readable medium according to claim 15, wherein if the information used to indicate the relationship between the CSI-RS measurement resource and the SRS measurement resource comprises a time offset or a time offset index of a time location of the CSI-RS measurement resource relative to a configuration moment and a time offset or a time offset index of a time location of the SRS measurement resource relative to the CSI-RS measurement resource, the determining the CSI-RS measurement resource and the SRS measurement resource based on the configuration information comprises:
    determining the CSI-RS measurement resource based on the time offset or the time offset index of the time location of the CSI-RS measurement resource relative to the configuration moment; and determining the SRS measurement resource based on the CSI-RS measurement resource and the time offset or the time offset index of the time location of the SRS measurement resource relative to the CSI-RS measurement resource.

20. The non-transitory computer-readable medium according to claim 15, wherein if the information used to indicate the relationship between the CSI-RS measurement resource and the SRS measurement resource comprises a time offset or a time offset index of a time location of the SRS measurement resource relative to a configuration moment and a time offset or a time offset index of a time location of the CSI-RS measurement resource relative to the SRS measurement resource, the determining the CSI-RS measurement resource and the SRS measurement resource based on the configuration information comprises:
  determining the SRS measurement resource based on the time offset or the time offset index of the time location of the SRS measurement resource relative to the configuration moment; and
  determining the CSI-RS measurement resource based on the SRS measurement resource and the time offset or the time offset index of the time location of the CSI-RS measurement resource relative to the SRS measurement resource.

* * * * *